United States Patent [19]

Verge et al.

[11] 4,075,222

[45] Feb. 21, 1978

[54] 3-(5-NITRO-2-IMIDAZOLYL)PYRAZOLES

[75] Inventors: John Pomfret Verge, Henley-on-Thames; Martin Charles Neville, Tadley, both of England; Henry Friedman, Indianapolis, Ind.

[73] Assignee: Eli Lilly and Company, Indianapolis, Ind.

[21] Appl. No.: 683,985

[22] Filed: May 6, 1976

Related U.S. Application Data

[60] Division of Ser. No. 558,591, March 14, 1975, Pat. No. 3,980,794, which is a continuation-in-part of Ser. No. 469,176, May 13, 1974, Pat. No. 3,947,467, which is a continuation-in-part of Ser. No. 385,136, Aug. 2, 1973, abandoned.

[51] Int. Cl.$^2$ ............... C07D 233/92; A01N 9/22
[52] U.S. Cl. ................... 548/336; 424/273 P; 542/406

[58] Field of Search ..................... 260/310 R

[56] References Cited

U.S. PATENT DOCUMENTS

4,001,230   1/1977   Friedman .................. 260/310 R

*Primary Examiner*—James O. Thomas, Jr.
*Assistant Examiner*—Jane T. Fan
*Attorney, Agent, or Firm*—Dwight E. Morrison; Everet F. Smith

[57] ABSTRACT

There are disclosed novel 3-(5-nitro-2-imidazolyl)-pyrazoles exhibiting utility as antibacterial, antiprotozoal, and antifungal agents, making the compounds useful particularly in veterinary medicine, especially in controlling bacterial and protozoal infections of cattle, swine, and poultry. The compounds are also active as growth promoters in chickens.

8 Claims, No Drawings

3-(5-NITRO-2-IMIDAZOLYL)PYRAZOLES

CROSS REFERENCE

This is a division, of application Ser. No. 558,591, filed Mar. 14, 1975 now U.S. Pat. No. 3,980,794 which was a continuation-in-part of Appln. Ser. No. 469,176, filed May 13, 1974, now U.S. Pat. No. 3,947,467 (Mar. 30, 1976), which was a continuation-in-part of our then copending Appln. Ser. No. 385,136, filed Aug. 2, 1973, now abandoned.

BACKGROUND OF THE INVENTION

1. Field of the Invention

A great deal of research has been conducted to develop agents for the control of bacterial and protozoal infections of poultry, swine and cattle. Thus, compounds and methods for controlling colibacillosis, pasteurellosis and salmonellosis in cattle, chickens, and swine, coccidiosis in chickens, as well as swine dysentery, have been the subject of extended research for many years.

2. Description of the Prior Art

In the prior art, British Pat. No. 1,285,932, published Aug. 16, 1972, teaches substituted 5-nitrofuran compounds, including 5-amino-4-cyano-1-methyl-3-(5-nitro-2-furyl)pyrazole, methods for preparation of the compounds, and medicaments containing the substituted nitrofurans as the active ingredient. The compounds are taught as possessing activity as antimicrobial, anthelmintic and antiprotozoal agents, and also as being active as coccidiostats, trypanocides, and antimalarial agents.

Also in the prior art is British Pat. No. 1,363,323, published Aug. 14, 1974, which teaches 2-(5-nitro-2-imidazolyl)pyrimidines, and methods for their preparation. The compounds are taught as being active as trichomonacides, bactericides, and antifungals, as well as being useful for the treatment of vaginal infections.

Tomcufcik et al., U.S. Pat. No. 3,452,034 (June 24, 1969), teach substituted 2-(1,3,4-thiadiazol-2-yl)-4(5)-nitroimidazoles and the preparation thereof. The compounds are taught as being useful as antibacterials, amoebicides, trichomonacides, and coccidiostats.

Papaioannou, U.S. Pat. No. 3,682,942 (Aug. 8, 1972), teaches methods of preparing 2-(2-amino-1,3,4-thiadiazol-3-yl)-1-substituted-5-nitroimidazoles. The products are taught as being useful for the control of bacterial, parasitic, and protozoal infections in poultry and animals. In particular, the compounds are said to be effective against *Trichomonas vaginalis* and *Salmonella gallinarum* infections in poultry and animals, as described by Berkelhammer et al., U.S. Pat. No. 3,452,035 (June 24, 1969).

In addition, a series of 5-nitroimidazoles, substituted in the 2-position by heterocyclic ring systems, is disclosed by Rufer et al., Progr. Antimicrob. Anti-cancer Chemother., Proc. Int. Congr. Chemother., 6th 1969 (Pub. 1970), 1, 145–8. (Univ. Park Press: Baltimore, Maryland); Chem. Abstr. 74, 141632x (1971). These authors teach the compounds as being active against *Trichomonas vaginalis* in vitro.

Also in the prior art is Howarth et al., U.S. Pat. No. 3,682,953 (Aug. 8, 1972), directed to substituted 3-(5-nitro-2-furyl)pyrazoles and pharmaceutically-acceptable acid addition salts thereof, and to pharmaceutical and feedstuff compositions containing the compounds, as well as to methods for the treatment of microbial infections in mammals and to methods of protecting organic material against microbial attack using the claimed compounds. The compounds are alleged to have antibacterial, anthelmintic, antiprotozoal, coccidiostatic, trypanocidal, and antimalarial activity.

Another patent, Howarth et al., U.S. Pat. No. 3,682,956 (Aug. 8, 1972), is directed to 5-amino-4-carbamoyl-3-(5-nitro-2-furyl)pyrazoles taught as having antimicrobial activity. The compounds are taught as being used in the same manner as described by Howarth et al., U.S. Pat. No. 3,682,953, supra.

Also in the prior art is Howarth, U.S. Pat. No. 3,716,555 (Feb. 13, 1973), directed to derivatives of 3-(5-nitro-2-furyl)pyrazole, which compounds are taught as having antimicrobial properties and to be used in the same manner as described in the above two Howarth et al. patents.

Sarett et al., U.S. Pat. No. 3,719,759 (Mar. 6, 1973), is directed to antiprotozoal compositions containing nitroimidazoles. The nitroimidazole compounds taught include 1-substituted-2-aryl-5-nitroimidazoles, wherein aryl represents phenyl or naphthyl, substituted or unsubstituted, and the 1-substituent can be lower alkyl. The compounds are taught as being effective against protozoal infections such as histomoniasis, trichomoniasis, amoebiasis, and trypanosomiasis; as well as against helminths such as Heterakis and Ascarid species; bacteria such as Salmonella sp., *Streptococcus* sp., and *Escherichia coli*; and pleuro pneumonia-like organisms (PPLO).

In addition, Sarett et al., U.S. Pat. No. 3,399,211 (Aug. 27, 1968), teach methods for preparing the compounds utilized in the antiprotozoal compositions of U.S. Pat. No. 3,719,759, discussed supra.

Another prior art reference is Japanese Pat. No. 73-39935, also identified by Derwent No. 74115U, directed to the preparation of 3-(5-nitro-2-furyl)pyrazole derivatives, taught as being useful as fungicides, chemotherapeutics, antiseptics, and food additives.

The compounds described in the prior art set forth above differ significantly structurewise from those of the instant application.

SUMMARY OF THE INVENTION

This invention relates to novel substituted 3-(5-nitro-2-imidazolyl)pyrazoles which are active as antibacterial, antifungal, and antiprotozoal agents, and to methods for the preparation of the compounds. The novel compounds are active in vivo against *E. coli, P. multocida, S. typhimurium,* and coccidiosis in poultry and in mice. The novel compounds are active in vivo against *P. multocida* and *Salmonella dublin* in calves, and against *Salmonella choleraesuis* and *T. hyodysenteriae* in swine. Further, the compounds act as growth promoters when administered to chicks.

DESCRIPTION OF THE PREFERRED EMBODIMENT

This invention relates to novel substituted pyrazole compounds. More particularly, it relates to novel substituted 3-(5-nitro-2-imidazolyl)pyrazoles of the formula:

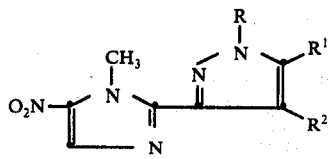

wherein

R is $C_1$-$C_3$ alkyl, halo($C_1$-$C_3$)alkyl, or hydroxy($C_1$-$C_3$)alkyl;

$R^1$ is

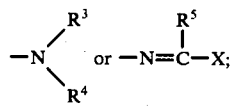

$R^2$ is hydrogen, cyano, carboxyl, or

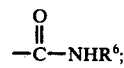

$R^3$ and $R^4$ are the same or different and are hydrogen, $C_1$-$C_3$ alkyl, —$SO_2N(CH_3)_2$, or $C_1$-$C_4$ alkanoyl;

$R^5$ is hydrogen or $C_1$-$C_3$ alkyl;

X is $OR^7$, phenyl, —CH↑CHCH$_3$, —CH↑CHC$_6$H$_5$, —CCl$_3$, 2-furyl, 3-pyridyl, 3,4-methylenedioxyphenyl, —NHNH($C_1$-$C_4$) alkyl or

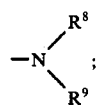

$R^6$ is hydrogen or $C_1$-$C_4$ alkanoyl;

$R^7$ is $C_1$-$C_8$ alkyl, $C_2$-$C_5$ alkenyl, or halo($C_1$-$C_3$)alkyl; and $R^8$ and $R^9$ are the same or different and are $C_1$-$C_3$ alkyl.

Of the compounds disclosed by the above formula, those which are preferred are of the formula

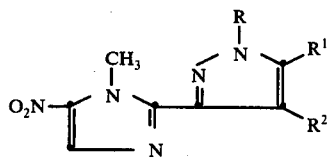

wherein

R is $C_1$-$C_3$ alkyl, halo($C_1$-$C_3$)alkyl, or hydroxy($C_1$-$C_3$)alkyl;

$R^1$ is

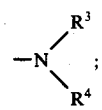

$R^2$ is cyano, carboxyl, or

$R^3$ and $R^4$ are the same or different and are hydrogen, $C_1$-$C_3$ alkyl, or $C_1$-$C_4$ alkanoyl; and $R^6$ is hydrogen or $C_1$-$C_4$ alkanoyl.

The novel compounds of this invention which are most preferred are of the formula

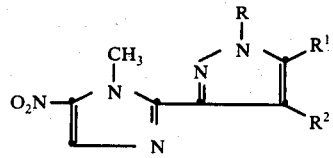

wherein

R is $C_1$-$C_3$ alkyl, halo($C_1$-$C_3$)alkyl, or hydroxy($C_1$-$C_3$)alkyl;

$R^1$ is

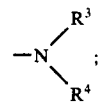

$R^2$ is cyano; and $R^3$ and $R^4$ are the same or different and are hydrogen or $C_1$-$C_3$ alkyl.

$C_1$-$C_8$ alkyl represents a straight or branched-chain saturated hydrocarbon radical such as methyl, ethyl, n-propyl, isopropyl, n-butyl, sec.-butyl, isobutyl, t-butyl, n-amyl, isoamyl, sec.-amyl, t-amyl, n-hexyl, iso-hexyl, sec.-hexyl, n-heptyl, isoheptyl, n-octyl, or isooctyl, and the like.

$C_2$-$C_5$ alkenyl represents a straight or branched-chain unsaturated hydrocarbon such as vinyl, allyl, crotyl, methallyl, 1-pentenyl, 1-methylbutenyl, 2-pentenyl, and the like.

Halo($C_1$-$C_3$)alkyl represents a halogenated straight or branched-chain saturated hydrocarbon such as halomethyl, 2-haloethyl, 3-halopropyl, 2-halopropyl, and the like, wherein halo is bromo, chloro, iodo, or fluoro.

Hydroxy($C_1$-$C_3$)alkyl represents hydroxymethyl, β-hydroxyethyl, and γ-hydroxypropyl.

The novel compounds coming within the scope of the generic formula, supra, have demonstrated in vitro activity against the following group of microorganisms, many of which are important animal pathogens:

*Escherichia coli*
*Salmonella dublin*
*Arizona paracolon*
*Pseudomonas*
*Pasteurella multocida* (bovine isolate) (avian isolate) (swine isolate)
*Pasteurella hemolytica*
Streptococcus (Mastitis)
Staphylococcus (Mastitis)
Group E streptococcus
*Spherophorus necrophorus*
*Bordetella bronchiseptica*
*Erysipelothrix rhusiopathiae*
*Mycoplasma gallisepticum*
*Mycoplasma synoviae*
*Mycoplasma hyopneumoniae*
*Mycoplasma hyosynoviae*
*Mycoplasma hyorhinis*
T-strain Mycoplasma (bovine)
*Bacteroides fragilis*

The novel compounds coming within the scope of the generic formula, supra, have also been found to possess in vivo activity. Thus, they have been found useful in controlling a number of infections in animals, such as *Escherichia coli* in poultry, *Pasteurella multocida* in chickens, turkeys, and mice, and *Salmonella typhimurium* in chickens. The control of these organisms is accomplished by administering an effective amount of the compound to the poultry or mice either by injection, or orally such as in the feed. The compounds have also been found effective as growth promoters when administered to chicks.

The novel compounds of this invention have shown in vivo activity in calves against *Pasteurella multocida* and *Salmonella dublin*. The novel compounds are also active in swine against *Salmonella choleraesuis*.

One of the novel compounds has been found to possess in vitro activity against Pseudomonas sp. and *Aeromonas liquefaciens*, both of which organisms are bacterial pathogens to fish.

The novel compounds of this invention have also been found to possess in vitro and in vivo activity against *Treponema hyodysenteriae*, the causative agent of swine dysentery. Swine dysentery is a contagious infectious disease characterized by a mucohemorrhagic diarrhea. The disease is economically significant due to the losses it causes from reduced rate of gain and feed efficiency, and from mortality. The disease incidence is high both in the United States and in those foreign countries wherein swine are raised intensively.

In addition, the novel compounds have shown in vitro activity against a number of anaerobic bacteria, as listed below:

*Actinomyces bovis* 13684
*Clostridium innocuum* 1373
*Clostridium perfringens* 81
*Clostridium ramosum* 1313
*Clostridium septicum* 1128
*Clostridium septicum bovine*
*Eubacterium aerofaciens* 1235
*Peptococcus anaerobius* 1428
*Peptostreptococcus intermedius* 1264
*Propionibacterium acnes* 44
*Propionibacterium acnes* 79
*Bacteroides fragilis* sp. fragilis 1877
*Bacteroides fragilis* sp. fragilis 1936B
*Bacteroides fragilis* sp. thetaiotaomicron 1438
*Bacteroides fragilis* sp. vulgatus 1563
*Bacteroides fragilis* sp. vulgatus 1211
*Fusobacterium symbiosum* 1470
*Fusobacterium necrophorum* 13859
*Veillonella alcalescens* 1

The novel compounds coming within the scope of the generic formula, supra, are readily synthesized starting with commercially available 2-methyl-5-nitroimidazole. This starting compound is allowed to react with a suitable alkylating agent, such as dimethyl sulfate, in a suitable solvent, for example benzene, to yield the compound identified as 1,2-dimethyl-5-nitroimidazole. This latter compound is in turn allowed to react with benzaldehyde in the presence of a base, for example sodium ethoxide in absolute ethanol, to yield 1-methyl-5-nitro-2-styrylimidazole.

The next step in the synthesis of the novel compounds of this invention is the oxidation of the styryl linkage of 1-methyl-5-nitro-2-styrylimidazole. This oxidation can be accomplished by any one of a number of oxidants suitable for oxidizing this type of linkage to the aldehyde (formyl) group.

According to one process, the oxidation can be accomplished by treating the 1-methyl-5-nitro-2-styrylimidazole, dissolved in a suitable solvent, with ozone at about room temperature. Suitable solvents include methanol, methanol and water mixture, or a mixture of methanol, methylene dichloride, and water, and the like.

Another method for oxidizing the styryl compound is taught by Henry et al., U.S. Pat. No. 3,472,864 (Oct. 14, 1969). These authors teach the use of an oxidizing system comprising an alkali metal periodate and osmium tetroxide in a suitable aqueous solvent medium, preferably water and 1,2-dimethoxyethane, at a temperature of from about 20° to 35° C., for a period of about 10 to 20 hours.

The 1-methyl-5-nitroimidazole-2-carboxyldehyde obtained by either of the two oxidation processes set forth above is the foundation stone, the basic starting material for the preparation of the novel compounds disclosed in this invention.

The next step in the preparation of the novel compounds involves allowing the 1-methyl-5-nitroimidazole-2-carboxaldehyde, prepared as described supra, to react with a substituted hydrazine of the formula $H_2N-NHR$, wherein R represents $C_1-C_3$ alkyl or hydroxy($C_1-C_3$)alkyl. The reaction is carried out in a suitable solvent such as chloroform, at reflux temperature, to yield a 1-methyl-5-nitroimidazole-2-carboxaldehyde alkyl or hydroxyalkyl hydrazone. Suitable substituted hydrazines for use in this reaction include methyl hydrazine, ethyl hydrazine, n-propyl hydrazine, isopropyl hydrazine, 2-hydroxyethyl hydrazine, and the like. The reaction conditions are the same for all the hydrazines. Thus, for example, when methyl hydrazine is allowed to react with 1-methyl-5-nitroimidazole-2-carboxaldehyde in chloroform solvent, there is obtained 1-methyl-5-nitroimidazole-2-carboxaldehyde methyl hydrazone.

The hydrazones formed in this manner are in turn allowed to react with N-bromosuccinimide at about room temperature in a suitable solvent, such as chloroform, to yield 1-methyl-5-nitroimidazole-2-carbonyl bromide alkyl or hydroxy-alkyl hydrazones. The reaction with N-bromosuccinimide is applicable to any of the substituted hydrazones to yield the bromo-substituted hydrazones. As a specific example, when 1-methyl-5-nitroimidazole-2-carboxaldehyde methyl hydrazone is allowed to react with N-bromosuccinimide at room temperature in chloroform solvent, there is obtained 1-methyl-5-nitroimidazole-2-carbonyl bromide methyl hydrazone.

This bromo-substituted hydrazone is unstable and has vesicant and lachrimatory properties. It is therefore used immediately without isolation or extensive purification. The bromo-substituted hydrazone is suspended in a suitable solvent, for example absolute methanol, and malononitrile is added thereto. To the mixture thus formed is added triethylamine dissolved in absolute methanol, while the temperature of the reaction mixture is maintained at about 10°-20° C. by suitable cooling means. This reaction is slightly exothermic and some cooling is required to maintain the desired temperature. As the reaction proceeds, the initial yellow suspension dissolves and is replaced by another suspension during a period of about 1 to about 2 hours. The solid material in this second suspension is the desired product, and is filtered off, washed with methanol and then with water, and dried. For example, when 1-methyl-5-nitroimidazole-2-carbonyl bromide methyl hydrazone is used, this solid material is identified by elemental analyses and NMR spectrum as 5-amino-1-methyl-3-(1-methyl-5-nitro-2-imidazolyl)pyrazole-4-carbonitrile. The homologous 5-amino-1-(alkyl or hydroxyalkyl)-3-(1-methyl-5-nitro-2-imidazolyl)pyrazole-4-carbonitriles can be prepared from the corresponding bromo-substituted alkyl or hydroxyalkyl hydrazones by following the same general procedure for reaction with malononitrile.

The preparation of a 5-amino-1-(haloalkyl)-3-(1-methyl-5-nitro-2-imidazolyl)pyrazole-4-carbonitrile is accomplished by reacting the corresponding hydroxyalkyl compound with a halogenating agent such as phosphorus trichloride, phosphorus tribromide, phosphorus trifluoride, thionyl chloride and the like. Thus, 5-amino-1-($\beta$-hydroxyethyl)-3-(1-methyl-5-nitro-2-imidazolyl)pyrazole-4-carbonitrile is allowed to react with thionyl chloride in an inert solvent such as benzene, in the presence of a small amount of dimethylformamide to yield 5-amino-1-($\beta$-chloroethyl)-3-(1-methyl-5-nitro-2-imidazolyl)pyrazole-4-carbonitrile.

The 5-amino group of the carbonitriles synthesized as disclosed hereinabove readily lends itself to the preparation of derivatives. Thus, the 5-amino substituent readily reacts with an alkanoyl halide in the presence of a tertiary amine using an inert solvent such as dimethylformamide. Suitable alkanoyl halides include acetyl chloride, propionyl chloride, butyryl chloride and the like. Suitable tertiary amines include pyridine, triethylamine and the like. The reaction is exothermic, and the products obtained depend on control of the reaction during the addition of the alkanoyl halide to the 5-amino compound in dimethylformamide as solvent. Thus, illustratively, acetyl chloride is added slowly to a mixture of 5-amino-1-methyl-3-(1-methyl-5-nitro-2-imidazolyl)pyrazole-4-carbonitrile and dimethylformamide, with little or no control of the exothermic reaction which occurs, followed by refluxing the reaction mixture for about two hours. The reaction product mixture is worked up by cooling and adding ice water thereto. The precipitate that forms is filtered off, recrystallized, and identified by elemental analyses as N-[4-cyano-1-methyl-3-(1-methyl-5-nitro-2-imidazolyl)-pyrazol-5-yl]acetamide.

Using the same reactants, but changing the procedure, yields different substituents on the 5-amino group. Thus, the acetyl chloride is added at such a rate that the exothermic reaction is avoided, followed by refluxing the reaction product mixture for about two hours. The reaction product mixture is worked up by adding water and filtering off the solid which precipitates. The solid is subjected to thin-layer chromatography. Two spots appear, one slow and one fast. The slow spot is identified as the monoacetyl compound described, supra. The fast spot is crystallized by fractional crystallization using a suitable solvent, such as commercial absolute ethanol. This product is identified by elemental analyses as 5-[[(dimethylamino)methylene]amino]-1-methyl-3-(1-methyl-5-nitro-2-imidazolyl)pyrazole-4-carbonitrile. This product comes about from the interreaction of the solvent dimethylformamide with the two principal reactants, the acetyl chloride and the 5-amino compound.

In addition, derivatives of the 5-amino substituent can readily be obtained by reaction with organic acid anhydrides such as acetic ahydride, propionic anhydride, trifluoroacetic anhydride, and the like. The product obtained by this procedure is the 5-dialkanoylamino derivative, with the 4-cyano group of the molecule intact. The reaction also may be run in the presence of a small amount of p-toluene-sulfonic acid. In this modified reaction, not only are substitutions on the 5-amino group effected, but derivatization of the 4-carbonitrile substituent is brought about. Thus, for example, when 5-amino-1-methyl-3-(1-methyl-5-nitro-2-imidazolyl)-pyrazole-4-carbonitrile is allowed to react with acetic anhydride in the presence of a small amount of p-toluenesulfonic acid monohydrate for about 2 hours, two products are obtained, which are identified as N-[4-(acetylcarbamoyl)-1-methyl-3-(1-methyl-5-nitro-2-imidazolyl)pyrazol-5-yl]diacetamide, and 5-amino-1-methyl-3-(1-methyl-5-nitro-2-imidazolyl)pyrazole-4-carboxylic acid, respectively.

Mono- or dialkyl derivatives of the 5-amino group can be readily obtained by methods well known in the art, for example by following the procedure taught in South African Pat. No. 70/02206 (1971), as well as the corresponding Canadian Patent No. 905,409 (Derwent No. 48907T), for the alkylation of 5-amino-4-cyano-3-(5'-nitrofur-2'-yl)isoxazoles. According to that general procedure the alkylation of the 5-amino group can be accomplished by allowing the 5-amino group to react with sodium hydride in dry tetrahydrofuran in an atmosphere of dry nitrogen to yield the sodium salt of the amino group. To the sodium salt thus formed is added a suitable alkyl halide, and the reaction proceeds to yield the alkylamine derivative. The reaction can also be carried out stepwise so that the alkyl substituents may be the same or different.

Another method of preparing alkyl derivatives of the 5-amino group involves heating to refluxing a mixture of a 5-amino carbonitrile, concentrated sulfuric acid, and absolute alkanol for a period of time. At the end of the heating period, usually about 2 hours, the reaction product mixture is added to water, the mixture cooled and made basic with, for example, concentrated ammonium hydroxide. The dark solid which precipitates is filtered off. The solid is chromatographed over silica gel using a suitable solvent such as ethyl acetate. There are obtained two products, identified as the 5-dialkylamino and the 5-monoalkylamino compounds, respectively. Thus, when 5-amino-1-methyl-3-(1-methyl-5-nitro-2-imidazolyl)pyrazole-4-carbonitrile is allowed to react with concentrated sulfuric acid and absolute ethanol as set forth above, the products obtained are identified as 5-(ethylamino)-1-methyl-3-(1-methyl-5-nitro-2-imidazolyl)-pyrazole, and 5-(diethylamino)-1-methyl-3-(1-methyl-5-nitro-2-imidazolyl)pyrazole, respectively. The process by which these compounds are prepared also serves to completely remove the carbonitrile group.

Formimidates, acetimidates, propionimidates, or butyrimidates are obtained from the 5-amino group by reaction with ortho esters such as triethyl orthoacetate, tri(n-propyl) orthoacetate, triethyl orthopropionate, triethyl orthoformate, trimethyl orthobutyrate, tri(n-butyl) orthoformate, or the like, in the presence of a small amount of acetic anhydride. Thus, for example, when the reactants are 5-amino-1-methyl-3-(1-methyl-5-nitro-2-imidazolyl)pyrazole-4-carbonitrile, triethyl orthoacetate, and a small amount of acetic anhydride, the product obtained is ethyl N-[4-cyano-1-methyl-3-(1-methyl-5-nitro-2-imidazolyl)pyrazol-5-yl]acetimidate. Other ortho esters which can be reacted with any of the 5-aminopyrazole-4-carbonitriles include triallyl orthoformate, tri(2-chloroethyl) orthoformate, tributyl orthoacetate, triisobutyl orthoformate, tri(2-ethylhexyl) orthoformate, triallyl orthoacetate, tributyl orthopropionate, tripropyl orthobutyrate, and the like.

An unexpected and unique variation occurs in the reaction between tricrotyl orthoformate and 5-amino-1-methyl-3-(1-methyl-5-nitro-2-imidazolyl)pyrazole-4-carbonitrile in the presence of acetic anhydride. There is obtained a product having a melting point of about 187°-190° C., and identified by elemental analyses and NMR spectrum as 5-(2-butenylideneamino)-1-methyl-3-(1-methyl-5-nitro-2-imidazolyl)pyrazole-4-carbonitrile.

Other alkylideneamino or arylideneamino derivatives are obtained by heating an alkyl or aryl aldehyde with 5-amino-1-methyl-3-(1-methyl-5-nitro-2-imidazolyl)-pyrazole-4-carbonitrile in the presence of acetic anhydride for a period of time. At the end of the heating period, usually about 16 to about 24 hours, the reaction product mixture is cooled, and the solid which separates is filtered off. The solid is recrystallized from a suitable solvent, for example, dimethylformamide, to yield the product, which is identified by elemental analysis and NMR spectrum. Thus, a mixture of 5-amino-1-methyl-3-(1-methyl-5-nitro-2-imidazolyl)pyrazole-4-carbonitrile, furfural, and acetic anhydride is refluxed overnight. The reaction product mixture is cooled. The solid which separates is filtered off, and recrystallized from dimethylformamide to yield a crystalline product having a melting point of about 238°-242° C. This product is identified by elemental analyses and NMR spectrum as 5-(2-furfurylideneamino)-1-methyl-3-(1-methyl-5-nitro-2-imidazolyl)pyrazole-4-carbonitrile.

Another grouping present in these novel compounds, namely the 4-carbonitrile group, can also be utilized to prepare derivatives. This carbonitrile group can be readily hydrolyzed to the 4-carboxamido grouping by allowing the carbonitrile to react with concentrated sulfuric acid in absolute ethanol. Illustratively, when 5-amino-1-methyl-3-(1-methyl-5-nitro-2-imidazolyl)-pyrazole-4-carbonitrile is allowed to react with concentrated sulfuric acid in absolute ethanol at steam bath temperature for about one hour, there is obtained 5-amino-1-methyl-3-(1-methyl-5-nitro-2-imidazolyl)-pyrazole-4-carboxamide.

The 4-carbonitrile can also be completely removed by refluxing the carbonitrile under acidic conditions, for example, in equal volumes of concentrated sulfuric acid and water, for a period of about 24 hours. Thus, when 5-amino-1-methyl-3-(1-methyl-5-nitro-2-imidazolyl)pyrazole-4-carbonitrile, and a mixture of equal volumes of concentrated sulfuric acid and water are refluxed for 24 hours, there is obtained 5-amino-1-methyl-3-(1-methyl-5-nitro-2-imidazolyl)pyrazole.

Hydrolysis of the 4-carbonitrile group to the carboxyl group occurs under the milder reaction conditions present when 5-amino-1-methyl-3-(1-methyl-5-nitro-2-imidazolyl)pyrazole-4-carbonitrile is allowed to react with acetic anhydride and a small amount of p-toluenesulfonic acid for about 8 hours at reflux temperature. Simultaneous acetylation of the 5-amino group and hydrolysis of the 4-carbonitrile group occurs, and there is obtained 5-acetamido-1-methyl-3-(1-methyl-5-nitro-2-imidazolyl)pyrazole-4-carboxylic acid. It is identified by elemental analyses and NMR spectrum.

The following preparation and examples more fully illustrate the synthesis of the novel compounds of this invention. These examples are not intended to limit the scope of the invention in any way.

PREPARATION

1-Methyl-5-nitroimidazole-2-carboxaldehyde

To a solution of 5 g. (0.0394 mole) of 2-methyl-5-nitroimidazole in 100 ml. of refluxing benzene, there was added, dropwise, a solution of 5 g. (0.0394 mole) of dimethyl sulfate in 10 ml. of benzene. The reaction mixture was allowed to reflux overnight. It was then cooled and there was added dropwise a solution of 6 g. potassium carbonate in 6 ml. of water. The mixture was stirred for one hour and filtered. The organic and aqueous layers of the filtrate were separated and the aqueous layer was washed with 2 × 50 ml. portions of benzene. The benzene extract was combined with the original organic layer and dried over anhydrous magnesium sulfate. The drying agent was filtered off. The filtrate was concentrated in vacuo to yield product having a melting point of about 135° to 138° C. It was identified as 1,2-dimethyl-5-nitroimidazole. Weight = 4 g.

In a 10-liter round-bottom flask equipped with mechanical stirrer, reflux condenser, and dropping funnel, there was placed 705 g (5.0 mole) of 1,2-dimethyl-5-nitro-imidazole and 3.75 liters of absolute ethanol. Solution was accomplished with stirring. To the solution thus prepared, 685 g. (6.5 mole) of benzaldehyde was added rapidly. To this mixture was rapidly added 150 g. of sodium dissolved in 2.5 l. of methanol, the addition being carried out at room temperature. The reaction mixture was stirred and heated to about 70° C., for a period of about 90 minutes. At a temperature of 40° C., the color changed to dark brown. At the end of the 90 minutes, the reaction product mixture was allowed to cool for 90 minutes by immersing the reaction vessel in an ice water bath. A precipitate formed. The brown mixture was filtered. The crystalline product was washed four times with a mixture of ice, water, and ethanol, in a 1:1:1 ratio using one liter of the mixture. The crystalline product was air dried at 100° C. It was identified as 1-methyl-5-nitro-2-styrylimidazole. It had a melting point of about 191°-192° C. Weight = 582 g.

In a three-neck, round-bottom, 5-liter flask equipped with a stirrer and gas introduction tube, there was prepared a solution of 454 g. (2.0 mole) of 1-methyl-5-nitro-2-styrylimidazole in a mixture of 2.5 liters of methanol, 1.5 liters of dichloromethane, and 200 ml. of water. The flask was maintained at room temperature by means of a water bath. A mixture of ozone and oxygen (3 percent $O_3$ at 1.1 liters per minute) was passed through the solution. The formation of the ozonide was monitored at intervals by gas-liquid chromatography (GLC) and thin-layer chromatography (TLC). The total ozonolysis time was about 25 hours, at the end of which time the solution had turned a pale yellow color.

A solution of 594 g. of sodium iodide in 2 liters of water and 400 ml. of acetic acid was stirred in a round-bottom, 10-liter flask while the ozonolysis solution was poured in fairly rapidly, keeping the temperature below 40° C. by means of an ice water bath. After stirring the mixture for about 10 minutes, a solution of sodium metabisulfite (192 g. in 2 liters of water) was added to remove the free iodine and cause the resultant solution to turn yellow. The mixture was stirred for about another hour. The mixture was then filtered and the yellow crystals discarded. The filtrate was concentrated in vacuo to about one-third its volume and neutralized to a pH of 6.5 by the addition of solid sodium bicarbonate with stirring. This required about 300 g. of the sodium bicarbonate. The mixture was extracted with 4 × 700 ml. portions of ethyl acetate. The combined ethyl acetate extracts were dried over anhydrous magnesium sulfate for about one-half hour. The drying agent was filtered off and the filtrate concentrated in vacuo to yield a sticky solid. This solid was taken up in about 2.5 liters of n-hexane and the mixture refluxed for about 15 minutes. The residual brown solid was removed by filtration. On cooling, the filtrate deposited yellow crystals which were filtered off and dried in vacuo at 40° C. The filtrate was used to reflux the residual brown solid from above in the same manner as before until four such extractions were carried out. There was obtained a total of about 146 g. of product having a melting point of about 81°–83° C., and identified as 1-methyl-5-nitroimidazole-2-carboxaldehyde.

EXAMPLE 1

5-Amino-1-methyl-3-(1-methyl-5-nitro-2-imidazolyl)-pyrazole-4-carbonitrile

A mixture of 23.5 g. (0.152 mole) of 1-methyl-5-nitroimidazole-2-carboxaldehyde and 7.0 g. (0.152 mole) of methyl hydrazine in 300 ml. of chloroform was boiled under reflux for about 2 hours. The reaction product mixture was evaporated to dryness to yield a bright yellow solid weighing about 25.5 g. The small sample crystallized from ethanol had a melting point of about 175° C. It was identified as 1-methyl-5-nitroimidazole-2-carboxaldehyde methyl hydrazone.

To a stirred solution of 23.5 g. (0.128 mole) of 1-methyl-5-nitroimidazole-2-carboxaldehyde methyl hydrazone in 200 ml. of chloroform, there was added slowly, at room temperature, 22.9 g. (0.128 mole) of N-bromosuccinimide. The reaction was slightly exothermic and the internal temperature was kept below 30° C. by occasional external cooling. After stirring for about 2 hours, the solvent chloroform was removed in vacuo and the residue extracted with 5 × 100 ml. of hot carbon tetrachloride. The insoluble residue was discarded and the combined carbon tetrachloride extracts were concentrated to give a bright yellow solid, identified as 1-methyl-5-nitroimidazole-2-carbonyl bromide methyl hydrazone. Thin-layer chromatography showed the compound was almost pure. Yield 31.0 g.

This compound is unstable and has vesicant and lachrimatory properties. It was used immediately in the next step of preparation.

The bromo hydrazone thus prepared, 31.0 g. (0.118 mole), was suspended in 250 ml. of absolute methanol and 7.80 g. (0.118 mole) of redistilled malononitrile was added. To the mixture was added dropwise a solution of 12 g. (0.118 mole) of triethylamine in 25 ml. of methanol while maintaining the reaction mixture at a temperature of about 10°–20° C. The reaction was slightly exothermic.

The initial yellow suspension dissolved and was replaced by another suspension during a period of about 1 to 2 hours. At the end of that time, the reaction product mixture was filtered and the solid material collected. The solid was washed with methanol, and then with water, and dried. This solid product had a melting point greater than 300° C. and weighed about 23 g. It was identified as 5-amino-1-methyl-3-(1-methyl-5-nitro-2-imidazolyl)pyrazole-4-carbonitrile. The product was analytically pure as isolated.

EXAMPLE 2

5-Amino-1-methyl-3-(1-methyl-5-nitro-2-imidazolyl)-pyrazole-4-carboxamide

To a mixture of 3 ml. of concentrated sulfuric acid and 2 ml. of absolute ethanol was added 1.0 g. of 5-amino-1-methyl-3-(1-methyl-5-nitro-2-imidazolyl)-pyrazole-4-carbonitrile. The mixture was heated on the steam bath for about 1 hour and then 10 ml. of water was added and the reaction mixture was allowed to stand overnight at ambient room temperature. A precipitate formed which was filtered off. The precipitate was recrystallized from commercial absolute ethanol to yield a solid having a melting point of about 255°–256° C. The solid was identified by elemental analyses and NMR spectrum as 5-amino-1-methyl-3-(1-methyl-5-nitro-2-imidazolyl)pyrazole-4-carboxamide.

EXAMPLE 3

5-Amino-1-methyl-3-(1-methyl-5-nitro-2-imidazolyl)-pyrazole

A mixture of 1.0 g. of 5-amino-1-methyl-3-(1-methyl-5-nitro-2-imidazolyl)pyrazole-4-carbonitrile, 10 ml. of water, and 10 ml. of concentrated sulfuric acid was refluxed for 24 hours. The reaction product mixture was cooled and 50 ml. of ether added. The pH of the mixture was adjusted to about pH 8 with concentrated ammonium hydroxide. The ether layer was separated and filtered to give a gold colored solid. The solid was chromatographed over a silica gel column, using acetone as solvent. A faster moving impurity (m.p. >360° C.) was first eluted. Subsequently, a yellow solid, melting at about 221°–226° C., was isolated and identified by IR and NMR spectra as 5-amino-1-methyl-3-(1-methyl-5-nitro-2-imidazolyl)pyrazole.

EXAMPLE 4

Ethyl N-[4-cyano-1-methyl-3-(1-methyl-5-nitro-2-imidazolyl)-pyrazol-5-yl]formimidate A mixture consisting of 1 ml. of acetic anhydride, 12 ml. of triethyl orthoformate, and 1 g. of 5-amino-1-methyl-3-(1-methyl-5-nitro-2-imidazolyl)pyrazole-4-carbonitrile was refluxed for about 5 hours. The reaction product mixture was allowed to cool to room temperature overnight. The precipitate which formed was filtered off and recrystallized from commercial absolute ethanol to yield product having a melting point of about 147°–149° C. (dec.). The product was identified by elemental analyses and NMR spectrum as ethyl N-[4-cyano-1-methyl-3-(1-methyl-5-nitro-2-imidazolyl)-pyrazol-5-yl]formimidate.

EXAMPLE 5

N-[4-Cyano-1-methyl-3-(1-methyl-5-nitro-2-imidazolyl)pyrazol-5-yl]diacetamide

A mixture of 25 ml. of acetic anhydride and 1 g. of 5-amino-1-methyl-3-(1-methyl-5-nitro-2-imidazolyl)-pyrazole-4-carbonitrile was refluxed overnight. The reaction product mixture was concentrated in vacuo and the residue was recrystallized from commercial absolute ethanol. Brown needles were obtained having a melting point of about 178°–180° C. The product was identified by elemental anaylses and NMR spectrum as N-[4-cyano-1-methyl-3-(1-methyl-5-nitro-2-imidazolyl)-pyrazol-5-yl]diacetamide.

EXAMPLE 6

Methyl N-[4-cyano-1-methyl-3-(1-methyl-5-nitro-2-imidazolyl)-pyrazol-5-yl]formimidate A mixture of 1 g. of 5-amino-1-methyl-3-(1-methyl-5-nitro-2-imidazolyl)pyrazole-4-carbonitrile, 12 ml. of trimethyl orthoformate, and 1 ml. of acetic anhydride was refluxed for about 24 hours. The reaction product mixture was filtered. The solid material which was filtered off was recrystallized from commercial absolute ethanol to yield product having a melting point of about 184°–185° C. The product was identified by elemental analyses and NMR spectrum as methyl N-[4-cyano-1-methyl-3-(1-methyl-5-nitro-2-imidazolyl)pyrazol-5-yl]formimidate.

EXAMPLE 7

Butyl N-[4-Cyano-1-methyl-3-(1-methyl-5-nitro-2-imidazolyl)pyrazol-5-yl]formimidate A mixture of 1 g. of 5-amino-1-methyl-3-(1-methyl-5-nitro-2-imidazolyl)pyrazole-4-carbonitrile, 12 ml. of tri-n-butyl orthoformate, and 1 ml. of acetic anhydride was refluxed for 24 hours and then cooled. The reaction product mixture was filtered. The solid material which was isolated was recrystallized from commercial absolute ethanol to yield a product having a melting point of about 120°–121° C. The product was identified by elemental analyses and NMR spectrum as butyl N-[4-cyano-1-methyl-3-(1-methyl-5-nitro-2-imidazolyl)-pyrazol-5-yl]formimidate.

EXAMPLE 8

N-[4-cyano-1-methyl-3-(1-methyl-5-nitro-2-imidazolyl)-pyrazol-5-yl]acetamide

A mixture of 1 g. of 5-amino-1-methyl-3-(1-methyl-5-nitro-2-imidazolyl)pyrazole-4-carbonitrile, 8 ml. of dimethylformamide, and 8 ml. of dry pyridine was prepared. To this mixture at room temperature was added very slowly 0.9 g. of acetyl chloride. After the addition was complete, the reaction mixture was refluxed for about 2 hours, cooled, and 25 ml. of ice water was added. The precipitate which formed was filtered off. It was recrystallized from commercial absolute ethanol to yield a product having a melting point of about 241°–242° C. dec. The product was identified by elemental analyses as N-[4-cyano-1-methyl-3-(1-methyl-5-nitro-2-imidazolyl)pyrazol-5-yl]acetamide.

EXAMPLE 9

5-[[(Dimethylamino)methylene]amino]-1-methyl-3-(1-methyl-5-nitro-2-imidazolyl)pyrazole-4-carbonitrile The procedure of Example 8 was repeated using the same quantities of reactants but the addition of the acetyl chloride was carried out much more slowly to avoid the exothermic reaction previously experienced. The reaction mixture was refluxed for about 2 hours. At the end of the reaction period, water was added to the reaction product mixture. The precipitate which formed was filtered off. Acidification of the mother liquor gave no additional precipitate.

The solid was subjected to thin-layer chromatography which showed a slow spot and a fast spot. The slow spot was identified as the monoacetyl compound described in Example 8. The fast spot was crystallized by fractional crystallization from commercial absolute ethanol to yield material having a melting point of about 231°–233° C. This material was identified by elemental analyses as 5-[[(dimethylamino)-methylene]amino]-1-methyl-3-(1-methyl-5-nitro-2-imidazolyl)-pyrazole-4-carbonitrile.

EXAMPLE 10

5-Amino-1-methyl-3-(1-methyl-5-nitro-2-imidazolyl)-pyrazole-4-carboxylic acid and N-[4-(acetylcarbamoyl)-1-methyl-3-(1-methyl-5-nitro-2-imidazolyl)pyrazol-5yl]diacetamide A mixture of 1 g. of 5-amino-1-methyl-3-(1-methyl-5-nitro-2-imidazolyl)pyrazole-4-carbonitrile, 0.4 g. of p-toluenesulfonic acid monohydrate, and 30 ml. of acetic anhydride was refluxed for about 2 hours. The reaction product mixture was concentrated in vacuo and the partially crystalline residue was recrystallized from commercial absolute ethanol to give two products, A and B.

Product A, which was insoluble in the commercial absolute ethanol, was recrystallized from dimethylformamide to yield material having a melting point of about 250°–251° C., dec. This product was identified by elemental analyses and NMR and IR spectra as 5-amino-1-methyl-3-(1-methyl-5-nitro-2-imidazolyl)-pyrazole-4-carboxylic acid.

Product B was recrystallized again from commercial absolute ethanol to yield material having a melting point of about 200°–202° C. The material was identified by elemental analyses as N-[4-(acetylcarbamoyl)-1-methyl-3-(1-methyl-5-nitro-2-imidazolyl)pyrazol-5-yl]diacetamide.

EXAMPLE 11

5-(Ethylamino)-1-methyl-3-(1-methyl-5-nitro-2-imidazolyl)-pyrazole and 5-(Diethylamino)-1-methyl-3-(1-methyl-5-nitro-2-imidazolyl)-pyrazole A mixture of 10 g. of 5-amino-1-methyl-3-(1-methyl-5-nitro-2-imidazolyl)pyrazole-4-carbonitrile, 30 ml. of concentrated sulfuric acid, and 20 ml. of absolute ethanol was refluxed for about 1 hour. To the reaction product mixture thus obtained was added 100 ml. of water and the dark mixture was cooled to room temperature. The mixture was made basic with concentrated ammonium hydroxide and filtered to recover a dark solid. This solid was chromatographed over silica gel using ethyl acetate as solvent and eluant, and there were obtained two compounds, A and B.

Compound A had a melting point of about 154°–157° C., and was identified by elemental analyses as 5-(ethylamino)-1-methyl-3-(1-methyl-5-nitro-2-imidazolyl)-pyrazole.

Compound B had a melting point of about 81°–82° C., and was identified by NMR and IR spectra and elemental analyses as 5-(diethylamino)-1-methyl-3-(1-methyl-5-nitro-2-imidazolyl)pyrazole.

EXAMPLE 12

5-Acetamido-1-methyl-3-(1-methyl-5-nitro-2-imidazolyl)-pyrazole-4-carboxylic acid A mixture of 1.0 g. of 5-amino-1-methyl-3-(1-methyl-5-nitro-2-imidazolyl)pyrazole-4-carbonitrile, 0.4 g. of p-toluenesulfonic acid and 30 ml. of acetic anhydride was refluxed for about 8 hours. The reaction product mixture was cooled and poured into a mixture of ice water. A white solid separated which was filtered off and recrystallized from dimethylformamide to yield product having a melting point of about 270°–271° C. The product was identified by elemental analyses and NMR and IR spectra as 5-acetamido-1-methyl-3-(1-methyl-5-nitro-2-imidazolyl)pyrazole-4-carboxylic acid.

EXAMPLE 13

Ethyl N-[4-cyano-1-methyl-3-(1-methyl-5-nitro-2-imidazolyl)-pyrazol-5-yl]acetimidate A mixture of 1.0 g. of 5-amino-1-methyl-3-(1-methyl-5-nitro-2-imidazolyl)pyrazole-4-carbonitrile, 12 ml. of triethyl orthoacetate, and 1 ml. of acetic anhydride was refluxed for about 26 hours and then allowed to cool overnight. The reaction product mixture was filtered and the solid was recrystallized from commercial absolute ethanol to yield product having a melting point of about 167°–168° C. The product was identified by elemental analyses and NMR spectrum as ethyl N-[4-cyano-1-methyl-3-(1-methyl-5-nitro-2-imidazolyl)-pyrazol-5-yl]acetimidate.

Following the same general procedure as set forth in Example 13 and using appropriate starting materials, the following additional compounds were prepared:

A. Allyl N-[4-cyano-1-methyl-3-(1-methyl-5-nitro-2-imidazolyl)pyrazol-5-yl]formimidate, having a melting point of about 131°–133° C. Identified by elemental analyses and NMR spectrum.

B. 2-Chloroethyl N-[4-cyano-1-methyl-3-(1-methyl-5-nitro-2-imidazolyl)pyrazol-5-yl]formimidate, having a melting point of about 169°–171° C. Identified by elemental analyses.

C. Isobutyl N-[4-cyano-1-methyl-3-(1-methyl-5-nitro-2-imidazolyl)pyrazol-5-yl]formimidate, having a melting point of about 134°–136° C. Identified by elemental analyses.

D. 2-Ethylhexyl N-[4-cyano-1-methyl-3-(1-methyl-5-nitro-2-imidazolyl)pyrazol-5-yl]formimidate, having a melting point of about 93°–94° C. Identified by elemental analyses.

EXAMPLE 14

5-Amino-1-(2-hydroxyethyl)-3-(1-methyl-5-nitro-2-imidazolyl)-pyrazole-4-carbonitrile A mixture of 15.5 g. (0.1 mole) of 1-methyl-5-nitro-2-imidazolecarboxaldehyde and 7.6 g. (0.1 mole) of 2-hydroxyethyl hydrazine in 300 ml. of chloroform was boiled under reflux for about 2 hours. The reaction product mixture was evaporated to dryness under vacuum to yield product weighing 21.3 g. and having a melting point of about 122°–129° C. A small sample recrystallized from water had a melting point of about 136°–140° C.

To a stirred solution of 21.3 g. (0.1 mole) of 1-methyl-5-nitro-2-imidazolecarboxaldehyde 2-hydroxyethyl hydrazone (prepared above) in 200 ml. of chloroform, there was added, in small portions, while keeping the temperature below 30° C., 17.8 g. (0.1 mole) of N-bromosuccinimide. The reaction mixture was stirred for about 3 hours at about 25° C. The reaction product mixture was concentrated in vacuo and the residue was extracted eight times with 500 ml. portions of hot carbon tetrachloride. The combined carbon tetrachloride extracts were concentrated in vacuo to yield a bright yellow solid, identified as 1-methyl-5-nitroimidazole-2-carbonyl bromide 2-hydroxyethyl hydrazone. The product had a melting point of about 85°–94° C., and weighed 20.7 g.

The bromo hydrazone thus prepared, 20.7 g. (0.071 mole), was suspended in 150 ml. of anhydrous methanol and 4.7 g. (0.071 mole) of malononitrile was added. To the mixture was added dropwise a solution of 7.3 g. of triethylamine in 15 ml. of absolute methanol, while maintaining the reaction temperature at about 10°–20° C., with an ice water bath.

A dense precipitate formed which was filtered off after about 1 hour and washed with a small amount of commercial absolute ethanol. The material had a melting point of about 242°–243° C. and was identified by elemental analyses and NMR spectrum as 5-amino-1-(2-hydroxyethyl)-3-(1-methyl-5-nitro-2-imidazolyl)-pyrazole-4-carbonitrile.

EXAMPLE 15

5-Amino-1-(2-chloroethyl)-3-(1-methyl-5-nitro-2-imidazolyl)-pyrazole-4-carbonitrile A mixture of 1 g. of 5-amino-1-(2-hydroxyethyl)-3-(1-methyl-5-nitro-2-imidazolyl)pyrazole-4-carbonitrile, 25 ml. of thionyl chloride, two drops of dimethylformamide, and 5 ml. of benzene was heated to refluxing for about 24 hours. The reaction product mixture was concentrated in vacuo to yield a red gum as a residue. This residue was triturated with commercial absolute ethanol to give a yellow solid weighing about 0.7 g. and having a melting point of about 226°–228° C. It was identified by elemental analyses and NMR spectrum as 5-amino-1-(2-chloroethyl)-3-(1-methyl-5-nitro-2-imidazolyl)pyrazole-4-carbonitrile.

EXAMPLE 16

5-Amino-1-ethyl-3-(1-methyl-5-nitro-2-imidazolyl)-pyrazole-4-carbonitrile

A mixture of 5.0 g. (0.0322 moles) of 1-methyl-5-nitroimidazole-2-carboxaldehyde, 3.4 g. (0.0322 moles) of ethyl hydrazine oxalate and 3.3 g. (0.0322 moles) of triethylamine in 100 ml. of chloroform was refluxed for about 24 hours. The reaction product mixture was cooled, slurried with about 25 ml. of water and the mixture filtered to yield a yellow solid. Thin-layer chromatography of a sample of the yellow solid using ethyl acetate-benzene in 1:1 ratio showed one main yellow spot plus two faster moving trace impurities. The product, 1-methyl-5-nitroimidazole-2-carboxaldehyde ethyl hydrazone was used without further purification.

To a stirred mixture of 6.8 g. (0.0322 moles) of 1-methyl-5-nitroimidazole-2-carboxaldehyde ethyl hydrazone and 100 ml. of chloroform was added portionwise 5.8 g. (0.0322 moles) of N-bromosuccinimide, while keeping the temperature of the reaction mixture at less than 30° C. After stirring at ambient room temperature for about 3 hours, the reaction product mixture was concentrated in vacuo. The residue which was obtained was extracted three times with 250 ml. portions of hot carbon tetrachloride. The combined carbon tetrachloride extracts were concentrated in vacuo to yield a yellow solid which weighed 6.3 g. This compound, 1-methyl-5-nitroimidazole-2-carbonyl bromide ethyl hydrazone, was used without purification in the next step of the preparation.

The bromo hydrazone thus prepared, 6.3 g. (0.0228 moles), was suspended in 75 ml. of absolute methanol and 1.5 g. (0.0228 moles) of malononitrile was added portionwise. The temperature was maintained at about 10°–20° C. using an ice water bath. After addition was complete, the reaction product mixture was stirred for about 1 hour at ambient room temperature. The reaction product mixture was filtered. The solid material which was recovered was recrystallized from dimethylformamide to yield a yellow solid weighing 2.3 g., having a melting point of about 284°–285° C., and identified by elemental analyses and NMR spectrum as 5-amino-1-ethyl-3-(1-methyl-5-nitro-2-imidazolyl)pyrazole-4-carbonitrile.

EXAMPLE 17

N-[1-Methyl-3-(1-methyl-5-nitro-2-imidazolyl)-4-(propionylcarbamoyl)pyrazol-5-yl]dipropionamide and 1-Methyl-3-(1-methyl-5-nitro-2-imidazolyl)-5-propionamido-N-propionylpyrazole-4-carboxamide A mixture of 1 g. of 5-amino-1-methyl-3-(1-methyl-5-nitro-2-imidazolyl)pyrazole-4-carbonitrile, 5 ml. of propionic anhydride, and 10 drops of concentrated sulfuric acid was refluxed for about 15 minutes and then the reaction product mixture was poured onto ice and the mixture made basic with concentrated ammonium hydroxide. The aqueous mixture was filtered to yield a solid which turned orange on standing. The solid was fractionally crystallized using commercial absolute ethanol to yield two products, A and B.

Product A had a melting point of about 211°–212° C. and was identified by NMR and infrared spectra as N-[1-methyl-3-(1-methyl-5-nitro-2-imidazolyl)-4-(propionylcarbamoyl)pyrazol-5-yl]dipropionamide.

Product B had a melting point of about 184°–185° C. and was identified by NMR and infrared spectra as 1-methyl-3-(1-methyl-5-nitro-2-imidazolyl)-5-propionamido-N-propionylpyrazole-4-carboxamide.

EXAMPLE 18

5-(2-Butenylideneamino)-1-methyl-3-(1-methyl-5-nitro-2-imidazolyl)pyrazole-4-carbonitrile A mixture of 1.0 g. of 5-amino-1-methyl-3-(1-methyl-5-nitro-2-imidazolyl)pyrazole-4-carbonitrile, 12 ml. of tricrotyl orthoformate, and 1 ml. of acetic anhydride was refluxed for about 24 hours, cooled and filtered. The solid obtained thereby was recrystallized two times from commercial absolute ethanol to yield product having a melting point of about 187°–190° C. The product was identified by elemental analyses and NMR spectrum as 5-(2-butenylideneamino)-1-methyl-3-(1-methyl-5-nitro-2-imidazolyl)pyrazole-4-carbonitrile.

EXAMPLE 19

5-(2-Furfurylideneamino)-1-methyl-3-(1-methyl-5-nitro-2-imidazolyl)pyrazole-4-carbonitrile A mixture of 2.0 g. of 5-amino-1-methyl-3-(1-methyl-5-nitro-2-imidazolyl)pyrazole-4-carbonitrile, 2 ml. of acetic anhydride, and 25 ml. of furfural was refluxed overnight. The reaction product mixture was cooled and the precipitate which formed was filtered off. The solid thus obtained was recrystallized from dimethylformamide and washed with cold commercial absolute ethanol. The crystalline product, having a melting point of about 238°–242° C., was identified by elemental analyses and NMR spectrum as 5-(2-furfurylideneamino)-1-methyl-3-(1-methyl-5-nitro-2-imidazolyl)pyrazole-4-carbonitrile.

Following the same general procedure as set forth in Example 19 and using appropriate starting materials, the following additional compounds were prepared:

A. 5-(3-Pyridylideneamino)-1-methyl-3-(1-methyl-5-nitro-2-imidazolyl)pyrazole-4-carbonitrile, having a melting point of about 257°–262° C. Identified by elemental analyses and NMR spectrum.

B. 5-(Benzylideneamino)-1-methyl-3-(1-methyl-5-nitro-2-imidazolyl)pyrazole-4-carbonitrile, having a melting point of about 236°–241° C. Identified by elemental analyses and NMR spectrum.

C. 5-(Cinnamylideneamino)-1-methyl-3-(1-methyl-5-nitro-2-imidazolyl)pyrazole-4-carbonitrile, having a melting point of about 234°–241° C. Identified by elemental analyses and NMR spectrum.

D. 5-[(2,2,2-Trichloroethylidene)amino]-1-methyl-3-(1-methyl-5-nitro-2-imidazolyl)pyrazole-4-carbonitrile, having a melting point of about 184°–187° C. Identified by elemental analyses and NMR spectrum.

EXAMPLE 20

N'-[4-Cyano-1-methyl-3-(1-methyl-5-nitroimidazol-2-yl)pyrazol-2-yl]-N,N-dimethylsulfamide A mixture of 1.0 g. of 5-amino-1-methyl-3-(1-methyl-5-nitro-2-imidazolyl)pyrazole-4-carbonitrile, 0.9 g. of sodium hydride, and 30 ml. of tetrahydrofuran was stirred at room temperature for about 30 minutes. To the mixture was then added 0.6 g. of dimethylsulfamoyl chloride at room temperature, and the mixture stirred for about 2 hours at room temperature. The reaction product mixture was concentrated in vacuo to remove the solvents. Water was added cautiously, followed by 2N aqueous hydrochloric acid until the mixture was adjusted to pH 4. The mixture was filtered. The solid material which was obtained was recrystallized from commercial absolute ethanol to yield dark crystals having a melting point of about 246°–249° C. These crystals were recrystallized again using a mixture of dimethylformamide and water to yield product having a melting point of about 250°–251° C. dec. The procuct was identified by elemental analyses as N'-[4-cyano-1-methyl-3-(1-methyl-5-nitroimidazol-2-yl)pyrazol-2-yl]-N,N-dimethylsulfamide.

EXAMPLE 21

N-[(4-Cyano-1-methyl-3-(1-methyl-5-nitroimidazol-2-yl)pyrazol-5-yl]formimidic acid, 2-methyl hydrazide A mixture of 1.0 g. of methyl N-[4-cyano-1-methyl-3-(1-methyl-5-nitro-2-imidazolyl)pyrazol-5-yl]formimidate, 1 ml. of methyl hydrazine, and 10 ml. of ethanol was stirred at ambient room temperature for about 1 hour. The reaction product mixture was filtered. The solid which was recovered was recrystallized from ethanol to yield product in the form of yellow needles having a melting point of about 232°–234° C. The product was identified by NMR spectrum and elemental analyses as N-[4-cyano-1-methyl-3-(1-methyl-5-nitroimidazol-2-yl)pyrazol-5-yl]formimidic acid, 2-methyl hydrazide.

EXAMPLE 22

5-Amino-1-(n-propyl)-3-(1-methyl-5-nitro-2-imidazolyl)pyrazole-4-carbonitrile

A mixture of 5 g. (32.2 mmoles) of 1-methyl-5-nitroimidazole-2-carboxaldehyde, 3.8 g. (32.2 mmoles) of propyl hydrazine oxalate, 100 ml. of chloroform, and 3.3 g. (32.2 mmoles) of triethylamine was refluxed for about 3.5 hours. The reaction mixture was cooled and concentrated in vacuo. The residue was extracted three times with 250 ml. portions of hot chloroform. The chloroform extracts were combined and concentrated in vacuo to yield 5.3 g. of crude hydrazone, identified as 1-methyl-5-nitro-2-imidazole-carboxaldehyde n-propyl hydrazone, which was used without further purification.

To a stirred suspension of 5.3 g. (0.0251 mole) of the hydrazone (prepared above) in 100 ml. of chloroform, there was added 4.6 g. (0.0251 mole) of N-bromosuccinimide. The addition was carried out portionwise, keeping the temperature of the mixture at below 30° C. by use of an ice water bath. The reaction mixture was then stirred at room temperature for about 3 hours. The reaction product mixture was concentrated in vacuo to remove the solvents and the residue was extracted three times with 250 ml. portions of hot carbon tetrachloride. The carbon tetrachloride extracts were combined and concentrated in vacuo to leave behind a crude bromo hydrazone identified as 1 -methyl-5-nitroimidazole-2-carbonyl bromide n-propyl hydrazone. This crude hydrazone was used as is without further purification.

The bromo hydrazone thus prepared was suspended in 75 ml. of anhydrous methanol, and 1.6 g. (0.025 mole) of malononitrile was added as a solid in portions. To the mixture was added dropwise 3.8 g. of triethylamine while maintaining the temperature of the mixture at about 10° to 20° C. by use of an ice bath. The reaction product mixture was stirred for about 1 hour at ambient room temperature. The reaction product mixture was then filtered and the solid which was thus isolated was recrystallized from dimethylformamide to yield product having a melting point of about 215°–216° C. The product was identified by NMR spectrum and elemental analyses as 5-amino-1-(n-propyl)-3-(1-methyl-5-nitro-2-imidazolyl)pyrazole-4-carbonitrile.

EXAMPLE 23

1-Methyl-5-[[3,4-(methylenedioxy)benzylidene]amino]-3-(1-methyl-5-nitroimidazol-2-yl)pyrazole-4-carbonitrile A mixture of 1.0 g. of 5-amino-1-methyl-3-(1-methyl-5-nitro-2-imidazolyl)pyrazole-4-carbonitrile, 0.7 g. of piperonal, and 1 ml. of acetic anhydride in 15 ml. of dimethylformamide was refluxed overnight. The reaction product mixture was cooled, and the precipitate which formed was filtered off. This solid was recrystallized from dimethylformamide to yield product having a melting point of about 173°–175° C. The product was identified by elemental analysis and NMR spectrum as 1-methyl-5-[[3,4-(methylenedioxy)benzylidene]amino]-3-(1-methyl-5-nitroimidazol-2-yl)pyrazole-4-carbonitrile.

The novel compounds of this invention have important antimicrobial properties, in particular antibacterial, antifungal, and antiprotozoal activity, useful in verterinary medicine. The compounds are particularly valuable in the treatment of infection of poultry caused by *Escherichia coli, Pasteurella multocida,* and *Salmonella typhimurium.* The compounds are also active as growth promoters in chicks.

Thus, for the treatment of *E. coli*-caused infection in chicks, the administration in the feed of a compound coming within the scope of the generic formula, supra, at a rate of from about 50 g. to about 200 g. per ton of feed is effective.

In chickens and turkeys, control of infections caused by *P. multocida* is effected by administration of one of the novel compounds in the feed at a rate of about 100 g. per ton.

Also in chickens, control of infections caused by *S. typhimurium* can be accomplished by the oral administration of one of the novel compounds at the rate of from about 25 to about 100 g. of compound per ton of fed. Infections in chickens and turkeys caused by *E. coli, P. multocida,* and *S. typhimurium* are controlled by the oral administration of one of the novel compounds in the feed at rates of from about 25 g. to about 200 g. per ton of feed.

Control of the infection caused by *S. typhimurium* in chickens can also be accomplished by administration of the novel compounds subcutaneously at a dosage of from about 3 mg. to about 60 mg. per kilogram of body weight.

Infections in mice caused by *P. multocida* can be controlled by administration by intraperitoneal injection of as little as 2.5 mg. of compound per kilogram of mouse body weight. *P. multocida* infections in mice can also be controlled by the oral administration of about 100 g. of compound per ton of feed.

5-Amino-1-methyl-3-(1-methyl-5-nitro-2-imidazolyl)-pyrazole-4-carbonitrile (compound 1), exemplary of the novel compounds of the genus, has been tested and found to be effective as a growth promoter when administered orally to chicks at the rate of from about 10 to about 50 g. per ton of feed.

Compound 1, exemplary of the novel compounds of this invention, has been tested and found effective in the control of *Treponema hyodysenteriae* in swine when administered in the feed at a level of about 100 g./ton. In addition, compound 1 has been found effective in the control of *Salmonella choleraesuis* in swine when administered in the feed at a level of about 50 g./ton.

Other tests have shown that compound 1 is effective in controlling *Salmonella dublin* in calves when administered orally to the calves at the rate of from about 100 mg./day/calf to about 1000 mg./day/calf. This dosage is the equivalent of from about 1.25 mg./lb. to about 11 mg./lb. of body weight.

The antimicrobial activity of the compounds has been demonstrated in a variety of tests as described hereinbelow.

EXPERIMENT 1

The efficacy of the novel compounds against *Pasteurella multocida* infections in mice when administered by injection was studied.

Female Swiss mice weighing from 15 to about 20 g. were used. The test compound, 5.0 mg., was weighed out and dissolved in 0.5 ml. of dimethyl sulfoxide, and this solution was added to 9.5 ml. of sodium carboxymethylcellulose suspension. Groups of five mice each were injected intraperitoneally with 0.1 ml. each of the above-prepared test composition. This preparation gave a test rate of 2.5 mg. per kilo of body weight of mouse. The compounds were tested at 2.5, 5.0, or 7.5 mg. per kilo of body weight of mouse, and the test preparations for rates of 5.0 and 7.5 mg./kg. were prepared in a similar manner. Immediately after receiving the test compound, the mice were challenged using $log_{10}$ dilutions of $10^{-4}$, $10^{-5}$, $10^{-6}$, and $10^{-7}$ of a 16 to 20-hour tryptose broth culture of *Pasteurella multocida* at 0.1 ml. per mouse subcutaneously. Similar groups of nontreated control mice were also challenged, the challenge being administered subcutaneously. The groups of mice were observed daily for mortality and the total mortality in treated groups compared with that which occurred in the non-medicated control groups. The results are set forth in Chart 1, which follows. Each test compound is identified by the number of the example describing its preparation.

In the chart, column 1 lists the test compound; column 2, the dosage of test compound in mg./kg. of mouse body weight; column 3, the dilution of the challenge organism; and column 4, the ratio of the number of mice surviving the test at each dosage and challenge dilution to the number of mice tested at each dosage and challenge dilution, called the survival ratio.

Chart 1

| Cpd. | Dose mg./kg. | Challenge Dilution | Survival Ratio |
| --- | --- | --- | --- |
| 1 | 7.5 | $10^{-4}$ | 7/10 |
|  |  | $10^{-5}$ | 9/10 |
|  |  | $10^{-6}$ | 10/10 |
|  | 5.0 | $10^{-4}$ | 3/10 |
|  |  | $10^{-5}$ | 9/10 |
|  |  | $10^{-6}$ | 18/20 |
|  |  | $10^{-7}$ | 10/10 |
|  | 2.5 | $10^{-4}$ | 1/10 |
|  |  | $10^{-5}$ | 8/20 |
|  |  | $10^{-6}$ | 24/30 |
|  |  | $10^{-7}$ | 19/20 |
| Infected Controls | — | $10^{-4}$ | 1/10 |
|  |  | $10^{-5}$ | 1/20 |
|  |  | $10^{-6}$ | 8/30 |
|  |  | $10^{-7}$ | 15/20 |
| 2 | 2.5 | $10^{-4}$ | 5/10 |
|  |  | $10^{-5}$ | 9/10 |
|  |  | $10^{-6}$ | 10/10 |
| Infected Controls | — | $10^{-4}$ | 0/10 |
|  |  | $10^{-5}$ | 2/10 |
|  |  | $10^{-6}$ | 8/10 |
| 5 | 2.5 | $10^{-4}$ | 10/10 |
|  |  | $10^{-5}$ | 9/10 |
|  |  | $10^{-6}$ | 10/10 |
| Infected Controls | — | $10^{-4}$ | 0/10 |
|  |  | $10^{-5}$ | 2/10 |
|  |  | $10^{-6}$ | 8/10 |
| 6 | 7.5 | $10^{-4}$ | 9/10 |
|  |  | $10^{-5}$ | 9/10 |
|  |  | $10^{-6}$ | 10/10 |
|  | 5.0 | $10^{-4}$ | 8/10 |
|  |  | $10^{-5}$ | 9/10 |
|  |  | $10^{-6}$ | 10/10 |
|  | 2.5 | $10^{-4}$ | 9/10 |
|  |  | $10^{-5}$ | 10/20 |
|  |  | $10^{-6}$ | 18/20 |
|  |  | $10^{-7}$ | 10/10 |
| Infected Controls | — | $10^{-4}$ | 1/10 |
|  |  | $10^{-5}$ | 1/20 |
|  |  | $10^{-6}$ | 5/20 |
|  |  | $10^{-7}$ | 8/10 |
| 7 | 7.5 | $10^{-4}$ | 5/10 |
|  |  | $10^{-5}$ | 7/10 |
|  |  | $10^{-6}$ | 10/10 |
|  | 5.0 | $10^{-4}$ | 6/20 |
|  |  | $10^{-5}$ | 9/20 |
|  |  | $10^{-6}$ | 15/20 |
|  | 2.5 | $10^{-4}$ | 3/20 |
|  |  | $10^{-5}$ | 7/20 |
|  |  | $10^{-6}$ | 14/20 |
| Infected Controls | — | $10^{-4}$ | 2/30 |
|  |  | $10^{-5}$ | 6/30 |
|  |  | $10^{-6}$ | 12/30 |
| 12 | 5.0 | $10^{-4}$ | 0/10 |
|  |  | $10^{-5}$ | 3/10 |
|  |  | $10^{-6}$ | 7/10 |
| Infected Controls | — | $10^{-4}$ | 0/10 |
|  |  | $10^{-5}$ | 1/10 |
|  |  | $10^{-6}$ | 1/10 |
| 13A | 5.0 | $10^{-4}$ | 3/5 |
|  |  | $10^{-5}$ | 4/5 |
|  |  | $10^{-6}$ | 5/5 |
| Infected Controls | — | $10^{-4}$ | 0/5 |

Chart 1-continued

| Cpd. | Dose mg./kg. | Challenge Dilution | Survival Ratio |
| --- | --- | --- | --- |
|  |  | $10^{-5}$ | 1/5 |
|  |  | $10^{-6}$ | 1/5 |
| 13B | 5.0 | $10^{-4}$ | 9/10 |
|  |  | $10^{-5}$ | 7/10 |
|  |  | $10^{-6}$ | 8/10 |
| Infected Controls | — | $10^{-4}$ | 0/10 |
|  |  | $10^{-5}$ | 1/10 |
|  |  | $10^{-6}$ | 1/10 |
| 13C | 7.5 | $10^{-4}$ | 8/10 |
|  |  | $10^{-5}$ | 10/10 |
|  |  | $10^{-6}$ | 10/10 |
|  | 5.0 | $10^{-4}$ | 8/20 |
|  |  | $10^{-5}$ | 16/20 |
|  |  | $10^{-6}$ | 18/20 |
|  | 2.5 | $10^{-4}$ | 4/10 |
|  |  | $10^{-5}$ | 3/10 |
|  |  | $10^{-6}$ | 7/10 |
| Infected Controls | — | $10^{-4}$ | 1/20 |
|  |  | $10^{-5}$ | 2/20 |
|  |  | $10^{-6}$ | 4/20 |
| 13D | 7.5 | $10^{-4}$ | 10/10 |
|  |  | $10^{-5}$ | 10/10 |
|  |  | $10^{-6}$ | 10/10 |
|  | 5.0 | $10^{-4}$ | 9/10 |
|  |  | $10^{-5}$ | 10/10 |
|  |  | $10^{-6}$ | 10/10 |
|  | 2.5 | $10^{-4}$ | 3/10 |
|  |  | $10^{-5}$ | 7/10 |
|  |  | $10^{-6}$ | 9/10 |
| Infected Controls | — | $10^{-4}$ | 1/10 |
|  |  | $10^{-5}$ | 1/10 |
|  |  | $10^{-6}$ | 3/10 |

EXPERIMENT 2

The efficacy of the novel compounds in the control of infections caused by *Salmonella typhimurium* in chickens was evaluated in the following manner.

The test was carried out using day-old chicks weighing approximately 35 g. each. The chicks were divided into groups of 5 chicks per each dosage level. A portion of the chicks received the test compound which was suspended in 0.2 ml. of polyethylene glycol 200 and administered subcutanusly in the neck. A control group of chicks did not receive the compound. All the chicks were challenged with a 1:200 dilution of a culture of the organism, 0.1 ml. of the dilution being injected into each chick in the leg intramuscularly. The chicks were observed for 6 days; the number of deaths occurring in the control group was compared with the number of deaths occurring in the chicks which received the test compound. The results are set forth in Chart 2, which follows. The test compounds are identified in the same manner as set forth in Experiment 1.

In the chart, column 1 lists the compounds tested; column 2, the dosage of test compound in mg./kg.; and column 3, the survival ratio.

Chart 2

| Cpd. | Dosage mg./kg. | Survival Ratio |
| --- | --- | --- |
| 1 | 60 | 47/70 |
|  | 30 | 27/50 |
|  | 15 | 36/50 |
|  | 7.5 | 22/35 |
|  | 3.75 | 11/25 |
| 2 | 60 | 7/15 |
|  | 30 | 11/25 |
|  | 15 | 6/15 |
|  | 7.5 | 0/10 |
| 5 | 60 | 9/20 |
|  | 30 | 8/20 |
|  | 15 | 0/10 |
|  | 7.5 | 0/10 |
| 6 | 60 | 7/15 |
|  | 30 | 10/20 |

Chart 2-continued

| Cpd. | Dosage mg./kg. | Survival Ratio |
|---|---|---|
| | 15 | 5/10 |
| | 7.5 | 9/10 |
| | 3.75 | 4/ 5 |
| 7 | 60 | 11/20 |
| | 30 | 8/20 |
| | 15 | 11/20 |
| | 7.5 | 0/ 5 |
| 8 | 60 | 6/10 |
| | 30 | 1/ 5 |
| | 15 | 0/ 5 |
| 13 | 60 | 13/20 |
| | 30 | 11/20 |
| | 15 | 8/20 |
| | 7.5 | 8/15 |
| 13A | 60 | 5/10 |
| | 30 | 5/15 |
| | 15 | 8/15 |
| | 7.5 | 7/15 |
| | 3.75 | 4/10 |
| 13B | 60 | 14/20 |
| | 30 | 10/20 |
| | 15 | 13/20 |
| | 7.5 | 1/10 |
| 13C | 60 | 10/15 |
| | 30 | 8/15 |
| | 15 | 7/15 |
| | 7.5 | 0/ 5 |
| 13D | 60 | 5/15 |
| | 30 | 1/10 |
| | 15 | 1/10 |
| 14 | 60 | 14/15 |
| | 30 | 6/15 |
| | 15 | 1/15 |
| | 7.5 | 1/ 5 |
| 18 | 60 | 10/15 |
| | 30 | 10/15 |
| | 15 | 8/15 |
| | 7.5 | 0/ 5 |
| Infected Controls | — | 9/50 |

EXPERIMENT 3

The oral activity of the novel compounds coming within the scope of the generic formula supra, against *Pasteurella multocida*, bovine strain, in mice as the host animal was demonstrated in the following manner.

White Swiss female mice weighing 15–20 g. each were used in the test. Seven groups of ten mice each were treated at a level of 100 g. of test compound per ton of feed. The animals received the medication in the feed for 2 days prior to challenge and for 7 days post challenge. Similar groups of mice on a ration without the antimicrobial agent were used as controls. Both the treated mice and the control groups of mice were challenged with $\log_{10}$ dilutions ranging from $10^{-2}$ through $10^{-8}$ of a 16 to 20-hour culture of *Pasteurella multocida*, bovine strain, at 0.1 ml. per mouse, administered subcutaneously. The mice were observed for 7 days, then the $LD_{50}$ for the various treated groups of mice and the $LD_{50}$ for the control group of mice were calculated. By subtracting the $LD_{50}$ of each of the treated groups from that of the control group of mice, there was obtained a figure called the protective index. The higher the protective index in value, the more active the compound was against the infection.

The results of this test for three of the most active compounds are shown in the following Chart 3. In the chart, column 1 lists the test compound, identified in the same manner as set forth in Experiment 1; and column 2 lists the protective index.

Chart 3

| Cpd. | Protective Index |
|---|---|
| 1 | >5.6 |
| 6 | 4.3 |
| 7 | 3.4 |

EXPERIMENT 4

The activity of certain of the nitroimidazoles against *Salmonella typhimurium* in chicks when administered in the feed was determined.

One-day-old chicks, divided into groups of 12, were given compound 1, 6, or 7 in the feed at levels of 100 g. per ton, 50 g. per ton, 25 g. per ton, and 10 g. per ton continuously throughout the experiments. Several replicates of nonmedicated infected control groups were included. Later on day 1, all replicates were given 50.0 ml. of a tryptose broth culture of *S. typhimurium* as their initial liquid for drinking. This was placed in the cage waterer and served as the challenge.

Daily records of mortality were maintained and survivors were weighed on the tenth day of the experiment, the day of termination. The results are set forth in Chart 4, which follows. The compounds tested are identified by the numbers 1, 6, and 7, as set forth hereinabove. In the chart, column 1 lists the test compound; column 2, the dosage level of test compound in grams per ton of feed; column 3 lists the number of replicates run on each compound at each dosage level; column 4 lists the survival ratio; and column 5, the final average chicken weight.

Chart 4
Control of S. typhimurium in Chickens (Oral)

| Cpd. | Dosage g./ton | No. of Replicates | Survival Ratio | Final Avg. Chicken Wt. |
|---|---|---|---|---|
| 1 | 100 | 3 | 35/36 | 105 g. |
| 6 | 100 | 3 | 33/36 | 101 |
| 7 | 100 | 3 | 33/36 | 102 |
| Infected Controls | — | 6 | 24/72 | 85 |
| 1 | 50 | 3 | 36/36 | 116 |
| 6 | 50 | 3 | 35/36 | 125 |
| 7 | 50 | 3 | 36/36 | 121 |
| Infected Controls | — | 6 | 45/72 | 94 |
| 1 | 25 | 3 | 36/36 | 121 |
| 6 | 25 | 3 | 36/36 | 119 |
| 7 | 25 | 3 | 34/36 | 117 |
| Infected Controls | — | 6 | 47/72 | 98 |
| 1 | 10 | 3 | 28/36 | 97 |
| 6 | 10 | 3 | 33/36 | 110 |
| 7 | 10 | 3 | 25/36 | 100 |
| Infected Controls | — | 6 | 59/72 | 98 |

EXPERIMENT 5

A. Selected examples of the novel compounds were evaluated for their oral activity against *Pasteurella multocida*-caused infection in chickens.

Four to five-week-old chickens were divided into groups of eight, and the compounds administered thereto in the feed. Two replicates were run for each compound. Twenty-four hours after the chickens began receiving the compound in their feed, the treated groups, as well as the nontreated control groups, were challenged intravenously with a broth culture of *P. multocida*. Each chicken received 0.5 ml. of $10^{-2}$ dilution of a 12-hour tryptose broth culture. The chicks were observed during seven days following the challenge and the mortality in the treated groups was compared to that of the control group. The heart and liver were removed from each chicken which died during the test and cultured to determine the presence of *P. multocida*. At the termination of the test, all surviving chickens were sacrified, the heart and liver removed from each chicken and cultured to determine the presence of *P. multocida*.

The results of the test are set forth in Chart 5, which follows. In the chart, column 1 identifies the compound tested; column 2, the dosage rate; column 3, the replicate number; column 4, the culture isolation of *P. multocida;* column 5, the survival ratio.

Chart 5

| | | | Control of P. multocida in Chickens | |
|---|---|---|---|---|
| Cpd. | Dosage g./ton | Replicate | Culture Isolation P. multocida | Survival Ratio |
| 1 | 100 | 1 | 0/ 8 | 8/ 8 |
| | | 2 | 1/ 8 | 8/ 8 |
| | | Total | 1/16 | 16/16 |
| 6 | 100 | 1 | 0/ 8 | 8/ 8 |
| | | 2 | 0/ 8 | 8/ 8 |
| | | Total | 0/16 | 16/16 |
| 7 | 100 | 1 | 2/ 8 | 6/ 8 |
| | | 2 | 2/ 8 | 8/ 8 |
| | | Total | 4/16 | 14/16 |
| Infected Controls | — | 1 | 8/ 8 | 0/ 8 |
| | | 2 | 8/ 8 | 2/ 8 |
| | | Total | 16/16 | 2/16 |

B. This same test was run in turkeys. Eight-week-old turkeys were utilized. The test compounds were administered to the turkeys in the feed and 24 hours after the start of the feed medication, the turkeys were challenged with 0.5 ml. of a $10^{-4}$ dilution of a broth culture of *P. multocida*. The experiment continued for 7 days afte challenge. The number of turkeys which died in the treated groups was compared with the number which died in the control group. As in the test with chickens, the heart and liver were removed from the turkeys which died during the test, and cultured for *P. multocida*. The turkeys which survived the test were sacrificed, the livers and hearts removed and cultured.

The results are recorded in Chart 6, which follows. In the chart, column 1 lists the test compound; column 2, the dosage of test compound in grams per ton of feed; column 3, the ratio of the number of turkeys from which *P. multocida* was cultured to the number of turkeys tested; and column 4, the survival ratio.

Chart 6

| Cpd. | Dosage g./ton | Culture Isolation P. multocida | Survival Ratio |
|---|---|---|---|
| 1 | 100 | 0/5 | 5/5 |
| 6 | 100 | 0/5 | 5/5 |
| 7 | 100 | 0/5 | 5/5 |
| Infected Controls | — | 4/5 | 1/5 |

EXPERIMENT 6

The evaluation of the effectiveness of selected nitroimidazoles for their oral activity against *E. coli* infection in chickens was accomplished as follows.

Broiler type, five-week-old chickens were wing-banded and individually weighed. Replicates of 8 chickens, each replicate having the same average chicken weight, were formed. Three replicates were run for each treatment. Treatment was initiated via the feed 24 hours prior to challenge. The *E. coli* challenge strain was No. 2-1-8. The challenge inoculum consisted of 0.5 ml. of $10^{-1}$ dilution of a 15-18 hour tryptose broth culture administered into the right thoracic air sac of each chicken. Eight to ten days following challenge, all surviving chickens were weighed and examined for lesions. Any chicken that died during the experiment was also examined for lesions such as air sac lesions, pericarditis lesions, and perihepatitis lesions, and a culture made. The pre-treatment average weight per bird was 790 g. The test compounds were the same as before, identified as 1, 6, and 7.

The results are shown in Chart 7, which follows. Column 1 lists the test compound; column 2, the dosage rate; column 3, the ratio of the number of chickens with lesions to the number of chickens tested; column 4, the average weight per chicken; and column 5, the survival ratio.

Chart 7

| Cpd. | Dosage g./ton | No. Chickens with lesions/ No. in group | Avg. Wt./ Chicken | Survival Ratio |
|---|---|---|---|---|
| 1 | 300 | 1/24 | 1014 g. | 24/24 |
| | 200 | 8/24 | 1104 | 24/24 |
| | 100 | 16/24 | 1058 | 24/24 |
| 6 | 300 | 6/24 | 1055 | 24/24 |
| | 200 | 1/24 | 1059 | 24/24 |
| | 100 | 11/24 | 1098 | 24/24 |
| 7 | 300 | 6/24 | 1132 | 24/24 |
| | 200 | 23/24 | 1033 | 24/24 |
| | 100 | 15/24 | 1023 | 24/24 |
| Infected Controls | 0 | 25/28 | 907 | 28/32 |
| Normal Controls | 0 | 0/16 | 1094 | 16/16 |

EXPERIMENT 7

5-Amino-1-methyl-3-(1-methyl-5-nitro-2-imidazolyl)-pyrazole-4-carbonitrile, compound 1, was fed to broiler chicks to evaluate its growth promotion efficacy.

The compound was fed at levels of 10, 25 and 50 g./ton of typical broiler rations (set forth below) to a total of 120 replicates of 8 birds each in four time-replicated studies.

| Broiler Ration | | |
|---|---|---|
| Ingredients | Diet 1 | Diet 2 |
| Corn, yellow, ground | 50.0% | 59.8% |
| Soybean oil meal, solvent extracted dehulled (50%) | 30.9 | 23.2 |
| Animal fat | 6.5 | 4.5 |
| Fish meal with solubles (60%) | 5.0 | 5.0 |
| Corn distillers dried solubles | 4.0 | 4.0 |
| Dicalcium phosphate, feed grade | 1.8 | 2.0 |
| Calcium carbonate (ground limestone) | 0.8 | 0.7 |
| Vitamin premix TK-01 (1.03)[1] | 0.5 | 0.5 |
| Salt (NaCl) | 0.3 | 0.13 |
| Trace mineral premix TK-01 (1.02)[2] | 0.1 | 0.1 |
| Methionine hydroxy analog | 0.1 | 0.07 |
| | 100.0 | 100.0 |

[1]Vitamin premix provides 3000 IU of Vitamin A, 900 ICU of Vitamin D, 40 mg. of Vitamin E, 0.7 mg. of Vitamin K, 1000 mg. of choline, 70 mg. of niacin, 4 mg. of pantothenic acid, 4 mg. of riboflavin, 0.10 mg. of Vitamin $B_{12}$, 0.10 mg. of biotin and 125 mg. of ethoxyquin per kg. of complete feed.
[2]Trace mineral premix provides 75 mg. of manganese, 50 mg. of zinc, 25 mg. of iron and 1 mg. of iodine per kg. of complete feed.

All the birds in the tests were re-brooded for seven days in floor pens before being placed on treatment. The treatment period extended for 21 days in starter batteries. Feed and water were provided ad libitum at all times. A nontreated feed was fed during the pre-brood period.

The results of the studies are presented in Chart 8. In the chart, column 1 gives the identification of the test compound; column 2, the level of administration of the test compound in the feed; column 3, the number of replicates per treatment; column 4, the average weight gain in grams; column 5, the percent improvement in weight gain; column 6, the feed conversion, which is the ratio of the feed consumed (F) to the weight gained (G); and column 7, the percent improvement in feed conversion.

All 10 and 50 g. data were obtained using Diet 1. The 25 g. data were obtained using Diet 1 (25%) and Diet 2 (75%).

Chart 8

| Treatment | Conc. Fed, g./t. | Reps/ Trt. | Wt.[1] Gn.,g. | % Impr. | F/G[1] | % Impr. |
|---|---|---|---|---|---|---|
| Control | — | 8 | 555 | — | 1.618 | — |
| Cpd. 1 | 10 | 8 | 580 | 4.50 | 1.580 | 2.35 |
| Control | — | 56 | 441 | — | 1.837 | — |
| Cpd. 1 | 25 | 32 | 468 | 6.12 | 1.751 | 4.68 |
| Control | — | 16 | 543 | — | 1.653 | — |
| Cpd. 1 | 50 | 16 | 564 | 3.87 | 1.578 | 4.54 |

[1]Compared to contemporary control treatment.

EXPERIMENT 8

A number of representative compounds, namely, 1, 5, 6, 7, 12, 13D, 14, and 18, were tested for their in vitro activity againt *Treponema hyodysenteriae*. The treponema were propagated on blood agar plates. Each plate which was prepared contained 20 ml. of trypticase soy agar (Baltimore Biological Laboratory [BBL] with 5.0 g./l. of yeast extract (Difco) and 5 percent sterile defibrinated horse blood. The plates were sterile plastic 15 × 100 mm. petri plates. Incubation was carried out at 37° C. for 4 days under anaerobic conditions using the BBL Gas Pak System.

The concentrations of test compounds in this initial test were prepared in dilutions ranging from 2000 mcg./ml. to 7.8 mcg./ml. The test procedure was carried out in the following manner. Five ml. of a twentyfold concentration in tryptose broth (Difco) of each filter-sterilized test compound dilution was mixed in a series of flasks containing 90 ml. of melted trypticase soy agar with yeast extract. Five ml. of horse blood was then added per flask. The contents of these flasks were then used to prepare a series of blood agar plates in doubling decreasing dilutions ranging from 100 mcg./ml. to 0.39 mcg./ml.

The treponema for inoculation of these plates were obtained by adding 3.0 ml. of sterile tryptose broth to the surface of a plate on which the treponema had been propogated. A sterile cotton-tipped swab was used to loosen the treponema from the agar. This suspension was then diluted 100-fold and each of the plates containing the test compounds was inoculated with 0.01 ml., along with the control plates which did not contain test compounds. The inoculum was spread so that is covered the surface of each plate, a bent sterile plastic pipette being used for this purpose for each plate. The plates were incubated at about 36° C for about 4 days and then examined for growth of the treponema. The minimum inhibitory concentration (MIC) of each test compound was the lowest concentration that prevented growth of treponema.

These representative compounds all inhibited growth of the treponema at each of the levels tested, and the MIC for these compounds was ≦0.39 mcg./ml.

The test was repeated using compound 1 in doubling decreasing dilutions ranging from 100 mcg./ml. to 0.048 mcg./ml. The MIC for compound 1 was found in this test to be 0.097 mcg./ml.

EXPERIMENT 9

The in vivo activity of compound 1 against *Treponema hyodysenteriae* was determined in the following manner.

The pigs for the in vivo experiment were purchased as healthy feeder pigs. Twenty-four pigs were brought to the research facility where they were weighed individually and identified by ear tag. Four groups of six pigs each were formed so that each group had essentially the same mean pig weight. On the sixth day, after the pigs had adjusted to their new grouping and facilities, two of the groups were given 5-amino-1-methyl-3-(1-methyl-5-nitro-2-imidazolyl)-pyrazole-4-carbonitrile (compound 1) in their feed at a level of 100 g./ton. This feed had the following composition:

| Ingredient | Percent | lbs./ton |
|---|---|---|
| Corn, yellow, ground | 73.20 | 1464 |
| Soybean oil meal, solvent extracted, dehulled, 50% | 12.30 | 246 |
| Alfalfa meal, dehydrated, 17% | 2.50 | 50 |
| Meat scraps, 55% | 2.50 | 50 |
| Fish meal | 2.50 | 50 |
| Distillers dried solubles (Corn) | 2.50 | 50 |
| Animal fat | 2.00 | 40 |
| Calcium carbonate | 0.70 | 14 |
| Dicalcium phosphate, feed grade | 0.50 | 10 |
| Salt (NaCl) | 0.50 | 10 |
| Swine vitamin premix SW-03[1] | 0.50 | 10 |
| Methionine hydroxy analog, 93% | 0.20 | 4 |
| Trace mineral premix, AN-03[2] | 0.10 | 2 |
| | 100.00 | 2000 |

[1]Each kg. of premix contains the following: 77,161 USP units Vitamin D$_2$; 2,205 Int. units Vitamin E; 441 mg. riboflavin; 1,620 mg. pantothenic acid; 2,205 mg. niacin; 4.4 mg. Vitamin B$_{12}$; 441 mg. Vitamin K; 19,180 mg. choline; 110 mg. folic acid; 165 mg. pyridoxine; 110 mg. thiamine; 22 mg. biotin.
[2]Each kg. of premix contains the following: 50 g. of manganese as manganese sulfate; 100 g. of zinc as zinc carbonate; 50 g. of iron as ferrous sulfate; 5 g. of copper as copper oxide; 1.5 g. of iodine as potassium iodide; and 150 g. maximum and 130 g. minimum calcium as calcium carbonate.

The other two groups of pigs were continued on an identical ration which did not contain the test compound.

On the eighth day of the experiment (2 days after initiation of treatment with the test compound), all of the pigs, that is, the 12 treated pigs and the 12 non-medicated control pigs, were challenged orally with a swine dysentery inoculum. The inoculum for the trial originated from a swine dysentery infected colon. Using this infected colon and following the procedure of Harris et al., Swine Dysentery: A Review, Iowa State University Veterinarian, No. 1, 4–11 (1971), the necessary inoculum was prepared. Each pig in the trial was given 10 ml. of the inoculum orally.

The two groups of pigs medicated with the test compound received the compound ad libitum in their feed for a total of 20 consecutive days. On the second day after the feed treatment was terminated (19 days post-challenge), one group of pigs receiving the test compound and one group of infected control pigs was sacrificed and examined for lesions of swine dysentery. The other group which had received the test compound and the remaining infected control group each was administered the nonmedicated feed and held for another eight days, and observed for recurrence of swine dysentery, a phenomenon that often occurs with this disease. At the end of this time (28 post-challenge), all remaining pigs were killed and examined for lesions.

Mortality records were kept on a daily basis throughout the trial. The consistency of the feces and the presence of blood and/or mucus were recorded daily throughout the trial on a pen basis. The pigs were weighed individually at the time of challenge, and on days 7, 14, 19, 21 and 28 of the trial.

The weight gain and mortality data and the total days in which diarrhea or mucohemorrhagic stools were observed in the various pens have been recorded in Chart 9, which follows. The average gain for the group of pigs receiving compound 1, and killed at 19 days post-challenge, was 22.0 lb., compared to an average gain of only 4.8 lb. for the infected nonmedicated controls killed at the same time. The average weight gain of the pigs in the medicated group killed 28 days post-challenge was 35.9 lb., while the infected, nonmedicated controls killed 28 days post-challenge had an average weight gain of 21.8 lb. None of the pigs receiving the test compound died during the trial, whereas four of the infected control pigs died. Diarrhea was not detected in the pigs receiving the test compound, but was seen for a total of 23 days in the nonmedicated control pigs.

The first signs of mucus and blood typical of swine dysentery appeared in the nonmedicated control pigs approximately one week following the challenge, and were noted for a total of 17 days. Mucus and blood were not observed at any time during the trial in the groups of pigs receiving the test compound. Recurrence of swine dysentery was not observed in the group of pigs receiving the test compound and continued on the basal ration without medication from day 17 until day 28 (replicate 2), whereas swine dysentery did continue in the nonmedicated pigs which were continued on the basal ration from day 17 until day 28.

There was a marked difference in the lesions found at necropsy of the medicated pigs and the infected nonmedicated control pigs. The colons of three of the four control pigs which died were hemorrhagic. Five of the eight surviving infected controls were found, at necropsy, to have mucohemorrhagic colons. Blood and/or mucus were not found in the colon of any pig receiving the test compound. Slight areas of hemorrhage in the colon and/or stomach were seen in most of the pigs receiving the test compound. This type of lesion has been observed on occasion in other groups of pigs not receiving this test compound and is not considered related to swine dysentery.

The test compound was shown to be highly effective in the control of induced swine dysentery based upon prevention of death, maintenance of weight gain, prevention of diarrhea and mucohemorrhagic stools, and prevention of colon lesions typical of swine dysentery.

The results of the in vivo test are shown in the table which follows.

Chart 9

Efficacy of Compound 1 Against Swine Dysentery

| Treatment | Group No. | Initial Wt.[1] (All pigs) | Avg. Wt. of Pigs Survivors (Days) | | | | | Avg. Gain (Survivors) From Day Of Challenge | Mortality (No. Died) | Fecal Observation | |
|---|---|---|---|---|---|---|---|---|---|---|---|
| | | | 7 | 14 | 19 | 21 | 28 | | | Days with Diarrhea in Pen | Days with Blood and Mucus in Pen |
| Cpd. 1 100 g./ton[2] | 1 | 35.3 | 43.3 | 51.0 | 57.3 | — | — | 22.0 | 0 | 0 | 0 |
| Infected Control | 1 | 35.7 | 41.0 | 41.0 | 40.5 | — | — | 4.8 | 2 | 10 | 9 |
| Cpd. 1 100 g./ton[2] | 2 | 35.3 | 42.1 | 50.0 | — | 59.7 | 71.2 | 35.9 | 0 | 0 | 0 |
| Infected Control | 2 | 35.2 | 41.6 | 43.6 | — | 46.2 | 56.0 | 21.8 | 2 | 13 | 8 |

[1]Weight at time of challenge
[2]Treatment was continuous from two days before challenge through 20 consecutive days
NOTE: Pigs in Group 1, both medicated and nonmedicated, were necropsied 19 days post-challenge

EXPERIMENT 10

The in vivo activity of compound 1 against pasteurellosis in calves was determined in the following manner.

Twelve calves weighing approximately 180 pounds each were obtained from a commercial source and were brought to the research facility where they were weighed individually and identified by ear tag. The calves were divided into two groups of six calves each, and two hundred thousand ascaris ova were administered to each calf seven days prior to the pasteurella challenge. The six calves in one of the groups were treated with 5-amino-1-methyl-3-(1-methyl-5-nitro-2-imidazolyl)pyrazole-4-carbonitrile (compound 1). The compound was administered orally in two equal doses of 2000 mg. each, using capsules containing 500 mg. of compound each. The actual dosage of the test compound ranged from about 45 to about 55 mg. per kilo per head per day. The treatment was initiated one day prior to the pasteurella challenge and was continued daily for a total of seven days. The remaining group of six calves did not receive treatment.

The pasteurella challenge was prepared using three isolates of *Pasteurella multocida* and three isolates of *Pasteurella hemolytica*, all of bovine origin. The isolates were grown in tryptose culture for about 18 hours and then mixed in equal parts in a challenge cocktail. Approximately 0.1 ml. was used to aerosol-exposure each calf. This exposure was carried out by placing a plastic bag over the head of each calf and running the aerosol into the bag. The pasteurella challenge was timed to coincide with the period of mechanical injury to the lung tissue caused by the ascarid larvae migration.

The body temperature of each calf was recorded daily following the challenge, and the body temperature was found to be considerably lower in the calves treated with compound 1 than in the infected control calves.

All the calves were sacrificed on the tenth day post-pasteurella challenge, and the extent of pneumonic lesions in the lung tissues noted. Thus, after the calves were sacrificed, the lungs were removed from each calf and examined for lesions grossly. In addition, attempts were made to re-isolate pasteurella from the pneumonic lung tissue.

All the calves treated with compound 1 showed a treatment response based upon control of lung lesions and reisolation of pasteurella from the lung tissue. A single treated calf was found to have a moderate pneumonic lung lesion. Three of the treated calves yielded no pasteurella from the lung tissue at necropsy. One of the treated calves was found to have numerous colonies of pasteurella in its lungs at necropsy. Another treated calf was found to have a moderate number of pasteurella colonies in its lungs at necropsy, while a third treated calf had only three pasteurella colonies present in its lungs at necropsy.

Five out of the six nonmedicated, infected control calves had moderate lung lesions. Numerous pasteurella were isolated from the lungs of four out of the six nonmedicated, control calves. One infected control culture was contaminated so that pastuerella could not have been isolated if it had been present.

EXPERIMENT 11

The in vivo activity of compound 1 against *Salmonella dublin* was determined in the following manner.

The calves for the in vivo experiment were purchased from a commerical source. Thirty-two calves were brought to the research facility where they were weighed individually and identified by ear tag. Each calf weighed about 90 pounds. The calves were then randomly divided by weight into eight groups of four calves each. Rectal swabs for *Salmonella dublin* and *Escherichia coli* isolation were obtained before treatment was started.

Four groups of four calves each were treated with the test compound. Treatment was started 24 hours after challenge with *Salmonella dublin* and continued for six consecutive days. Treatment was accomplished by oral administration twice daily of gelatin capsules of test compound 1. During the treatment, rectal swabs were taken daily of each calf and bacterial isolations for salmonella species were run. At the end of the trial, rectal swabs for *E. coli* and salmonella species were taken again. The trials were terminated the day following the last treatment, at which time the calves were weighed and sacrificed. Microbiological examination of organs taken from calves at the termination of the trial indicated a reduced number of salmonella isolates from calves in the treated groups.

The results of this test are recorded in Chart 10, which follows. In the chart, column 1 records the dose rate/day/calf; column 2, the dose rate in mg./lb.; column 3, the survival ratio observed; and column 4, the occurrence of salmonella isolates obtained at necropsy.

Chart 10

| Total Dose/day | Dose/lb. | Survival Ratio | Salmonella isolates** |
|---|---|---|---|
| 1000 mg.* | 11 mg. | 4/4 | 0/4 |
| Controls | | 1/4 | 4/4 |
| 500 mg.* | 5 mg. | 4/4 | 1/4 |
| Controls | | 2/4 | 4/4 |
| 250 mg.* | 2.5 mg. | 4/4 | 2/4 |
| Controls | | 4/4 | 3/4 |
| 100 mg.* | 1.25 mg. | 4/4 | 1/4 |
| Controls | | 2/4 | 4/4 |

*Given in two equal doses
**At necropsy

EXPERIMENT 12

The susceptibility of anaerobic bacteria, both gram positive and gram negative, to a representative number of the novel compounds of this application was determined using the agar dilution method. The bacteria used were isolated from patients hospitalized at the Indiana University Medical Center. The isolates were identified in the anaerobe laboratory of the Medical Center by the criteria extablished by Dowell et al., *Laboratory Methods in Anaerobic Bacteriology*. Public Health Serv. Publ. No. 1803 (1968) [Center for Disease Control, Atlanta Ga.]; and by Smith et al., *The Pathogenic Anaerobic Bacteria*, pages 96–136 (1968) [Charles C. Thomas, Publisher, Springfield, Ill.]. All the organisms were maintained in chopped meat glucose medium (Scott Labs) at room temperature.

The method used for the agar dilution tests was based on the studies on Sutter et al., *Antimicrob. Ag. Chemother.* 3, 188–193 (1973). The strains of anaerobic bacteria were grown in 16 × 120 mm. tubes for 16 to 18 hours in Thioglycolate medium without indicator—135C (Becton, Dickinson and Co.), to which was added 5 mcg. of hemin per milliliter prior to autoclaving, plus 1 mg. of sodium bicarbonate and 0.1 mcg. of filter-sterilized menadione per milliliter after autoclaving. The growth tubes for the bacteria *Veillonella alcalescens* were additionally supplemented with 5 mg. of solium lactate per milliliter. The strains were adjusted to the turbidity of the No. 1 McFarland standard in Thioglycolate medium without indicator—135C containing an additional 0.13 percent Bacto-agar (Difco). Each strain was then applied to the surface of the petri plate (100 mm. × 15 mm.) by means of a replicator.

For the agar dilution studies, two-fold dilutions of the test compounds were prepared in deionized water to which was then added laked sheep blood and filter-sterilized menadione so the concentrations after the agar dilution were 5 percent and 10 mcg./ml. respectively. An equal volume of double strength Brucella agar (Becton, Dickinson and Co.) was mixed with each dilution in a water bath held at 50° C. and then poured onto the petri plates.

All of the procedures were done inside a plastic glove box, except for the incubation of the growth tubes and the pouring of the plates. After the plates hardened, they were put inside the glove box for a minimum of two hours before they were inoculated. Generally, the glove box procedures of Aranki et al., *Applied Microbiology* 17, 568–576 (1969), were followed, but the following modifications were used. Dry materials were introduced into the glove box by evacuating the lock to 28 inches of mercury and filling once with nitrogen gas, followed by evactuating in the same manner and filling with an 80 percent nitrogen plus 10 percent $CO_2$ plus 10 percent hydrogen gas mixture. Liquid media and agar plates were introduced into the gloove box by evacuating the lock to 10 inches of mercury and filling with gas four times. The nitrogen gas was used to fill the lock for the first two cycles of evacuation, with the gas mixture described above used for the final two fillings.

All the plates were incubated at 37° C in Gas Pak jars (Becton, Dickinson and Co.) containing palladium-coated alumina catalysts (reactivated after each use). The results of the agar dilution tests were read after about 24 hours of incubation. The minimum inhibitory concentration (MIC) was recorded as the lowest concentration of test compound at which there was no growth.

The results of these in vitro tests are recorded in Charts 11 and 12 which follow. The test compounds are identified in the same manner as in the previous experiments. The antibiotics cephalothin and erythromycin were also run simultaneously with the novel compounds of this application, for comparison purposes, and the results are inclined in Charts 11 and 12 below.

one drop from a 24-hour broth culture of either *Pseudomonas sp.* or a strain of *Aeromonas liquefaciens.* The tubes were incubated overnight at about 37° C., and the minimum inhibitory concentration (MIC) determined and recorded.

The results are set forth in Chart 13, which follows. Column 1 lists the test compound, identified by its operating example number; column 2, lists the MIC for *Pseudomonas sp.;* and column 3, lists the MIC for *Aeromonas*

Chart 11

Susceptibility of Anaerobic Bacterial Isolates
24 Hr. Minimum Inhibitory Concentration (mcg./ml.)

| Compound | Actinomyces bovis 13684 | Clostridium innocuum 1373 | Clostridium perfringens 81 | Clostridium ramosum 1313 | Clostridium septicum 1128 | Clostridium septicum bovine | Eubacterium aerofaciens 1235 | Peptococcus anaerobius 1428 | Peptostreptococcus intermedius 1264 | Propionibacterium acnes 44 |
|---|---|---|---|---|---|---|---|---|---|---|
| 1 | <0.125 | <0.125 | <0.125 | <0.125 | <0.125 | <0.125 | <0.125 | <0.125 | 0.5 | >32 |
| 2 | <0.125 | <0.125 | <0.125 | <0.125 | <0.125 | <0.125 | <0.125 | <0.125 | 1.0 | 0.5 |
| 3 | <0.125 | <0.125 | <0.125 | 4 | <0.125 | <0.125 | <0.125 | <0.125 | 16 | 0.5 |
| 4 | <0.125 | <0.125 | <0.125 | <0.125 | <0.125 | <0.125 | <0.125 | <0.125 | 16 | >32 |
| 6 | <0.125 | <0.125 | <0.125 | <0.125 | <0.125 | <0.125 | <0.125 | <0.125 | 1.0 | >32 |
| 7 | <0.125 | <0.125 | <0.125 | <0.125 | <0.125 | <0.125 | <0.125 | <0.125 | 2 | >32 |
| 8 | 4.0 | 1.0 | 1.0 | 0.25 | 0.25 | 1.0 | 0.125 | 1.0 | 4 | >8 |
| 9 | <0.125 | <0.125 | <0.125 | <0.125 | <0.125 | <0.125 | <0.125 | <0.125 | >32 | >32 |
| 10A | 4 | 0.5 | 0.5 | 4 | 1.0 | 1.0 | <0.5 | 8 | 16 | >32 |
| 11A | 2 | 0.125 | 0.03 | 0.5 | 0.06 | 0.06 | <0.03 | 1.0 | 8 | 8 |
| 12 | 0.5 | 8 | 8 | 4 | 4 | 8 | 1.0 | 8 | 32 | >32 |
| 13A | 0.5 | 1.0 | 1.0 | 4 | 0.5 | 0.5 | <0.125 | 2 | 16 | >128 |
| 13D | 1.0 | 1.0 | 1.0 | 1.0 | 2 | 4 | 2 | 2 | 16 | 16 |
| 14 | <0.125 | <0.125 | <0.125 | <0.125 | <0.125 | <0.125 | <0.125 | <0.125 | 1.0 | >32 |
| 15 | 1.0 | <0.125 | <0.125 | 0.5 | 0.25 | <0.125 | <0.125 | <0.125 | 8 | >32 |
| 16 | <0.125 | <0.125 | <0.125 | <0.125 | <0.125 | <0.125 | <0.125 | 1.0 | 2 | >32 |
| 18 | <0.125 | <0.125 | <0.125 | <0.125 | <0.125 | <0.125 | <0.125 | <0.125 | 0.25 | >32 |
| 20 | 2 | 16 | 8 | 4 | 8 | 8 | 8 | 1.0 | 32 | >32 |
| 21 | <0.125 | <0.125 | <0.125 | <0.125 | <0.125 | <0.125 | <0.125 | <0.125 | 0.5 | 32 |
| 22 | <0.125 | <0.125 | <0.125 | <0.125 | <0.125 | <0.125 | <0.125 | <0.125 | 1.0 | >32 |
| Erythromycin 1.0 | >128 | <0.5 | >128 | 1.0 | <0.5 | 1.0 | 1.0 | 8 | <0.5 | |
| Cephalothin 2 | 8 | 2 | 8 | 1.0 | 4 | 2 | 2 | 1.0 | 2 | |

Chart 12

Susceptibility of Anaerobic Bacterial Isolates
24 Hr. Minimum Inhibitory Concentration (mcg./ml.)

| Compound | Propionibacterium acnes 79 | Bacteroides fragilis sp. fragilis 1877 | Bacteroides fragilis sp. fragilis 1936B | Bacteroides fragilis sp. thetaiotaomicron 1438 | Bacteroides fragilis sp. vulgatus 1563 | Bacteroides fragilis sp. vulgatus 1211 | Fusobacterium symbiosum 1470 | Fusobacterium necrophorum 13859 | Veillonella alcalescens 1 |
|---|---|---|---|---|---|---|---|---|---|
| 1 | <0.125 | <0.125 | <0.125 | <0.125 | <0.125 | <0.125 | <0.125 | <0.125 | <0.125 |
| 2 | <0.125 | <0.125 | <0.125 | <0.125 | <0.125 | <0.125 | <0.125 | <0.125 | <0.125 |
| 3 | <0.125 | <0.125 | <0.125 | <0.125 | <0.125 | <0.125 | <0.125 | <0.125 | <0.125 |
| 4 | <0.125 | <0.125 | <0.125 | <0.125 | <0.125 | <0.125 | <0.125 | <0.125 | <0.125 |
| 6 | <0.125 | <0.125 | <0.125 | <0.125 | <0.125 | <0.125 | <0.125 | <0.125 | <0.125 |
| 7 | <0.125 | <0.125 | <0.125 | <0.125 | <0.125 | <0.125 | <0.125 | <0.125 | <0.125 |
| 8 | 0.03 | 0.25 | 0.25 | 0.5 | 0.25 | 0.25 | 0.03 | 0.06 | 0.03 |
| 9 | <0.125 | <0.125 | <0.125 | <0.125 | 0.25 | <0.125 | <0.125 | <0.125 | <0.125 |
| 10A | 0.5 | 0.5 | 8 | 0.25 | 0.25 | 0.25 | <0.125 | <0.125 | <0.125 |
| 11A | <0.03 | 0.06 | 2 | 0.06 | <0.03 | <0.03 | <0.03 | <0.03 | 1.0 |
| 12 | 1.0 | 4 | 16 | 2 | 1.0 | 2 | <0.125 | <0.125 | 0.5 |
| 13A | <0.125 | 0.5 | 2 | 0.25 | 0.25 | <0.125 | <0.125 | <0.125 | <0.125 |
| 13D | 2 | 2 | 0.5 | 1.0 | 0.5 | 1.0 | 1.0 | <0.125 | 0.25 |
| 14 | <0.125 | <0.125 | <0.125 | <0.125 | <0.125 | <0.125 | <0.125 | <0.125 | <0.125 |
| 15 | <0.125 | <0.125 | 0.5 | <0.125 | <0.125 | <0.125 | <0.125 | <0.125 | <0.125 |
| 16 | <0.125 | <0.125 | 0.25 | <0.125 | <0.125 | <0.125 | <0.125 | <0.125 | <0.125 |
| 18 | <0.125 | <0.125 | <0.125 | <0.125 | <0.125 | <0.125 | <0.125 | <0.125 | <0.125 |
| 20 | 1.0 | 4 | 2 | 4 | 1.0 | 2 | 4 | 1.0 | 1.0 |
| 21 | <0.125 | <0.125 | <0.125 | <0.125 | <0.125 | <0.125 | <0.125 | <0.125 | <0.125 |
| 22 | <0.125 | <0.125 | <0.125 | <0.125 | <0.125 | <0.125 | <0.125 | <0.125 | <0.125 |
| Erythromycin | <0.5 | 4 | 4 | 4 | 2 | 2 | <0.5 | 2 | 1 |
| Cephalothin | 1.0 | >128 | >128 | 64 | 8 | 4 | 64 | <0.5 | <0.5 |

EXPERIMENT 13

The in vitro activity of compound 1 against two fish bacterial pathogens was determined using tryptose broth and the standard tube dilution test system. Doubling dilutions ranging from 100.0 to 0.78 mcg./ml. of compound 1 were prepared in 5 ml. amounts of tryptose broth. Each tube in the series was then inoculated with

*liquefaciens.*

Chart 13

| Compound of Example No. | Pseudomonas mcg./ml. | Aeromonas liquefaciens mcg./ml. |
|---|---|---|
| 1 | 6.25 | 3.12 |

EXPERIMENT 14

The in vivo activity of compound 1 against *Salmonella choleraesuis* was determined in the following manner.

Twenty-four healthy feeder pigs were purchased from a local farm and brought to the research facility where they were weighed individually and identified by ear tag. Four groups of six pigs each were formed so that the average pig weight per group was similar.

Two groups of pigs were given compound 1 at a level of 50 g./ton in the feed. The remaining two groups of pigs were fed the same basal ration without compound 1. Twenty-four hours after initiation of the compound 1 feed treatment, all four groups were challenged orally using 10 ml. of a broth culture of *Salmonella choleraesuis*.

The pigs were weighed weekly througout the duration of the experiment and on the 28th day postsalmonella challenge, each surviving pig was killed and the salmonella-caused lesions were recorded. Chart 14, which follows, contains a summary of the results from the trial. Compound 1, administered in the feed at a level of 50 g./ton continuously, resulted in improved weight gain (an average of 4.3 lbs./pig) over that of infected pigs, and also prevented mortality.

Chart 14

| Treatment Group | Rep No. | Mean Pig Wt. (Lbs.) | | | | | | No. Dead/ No. in Grp. | Lesions at Necropsy |
|---|---|---|---|---|---|---|---|---|---|
| | | −7 | 0 | 7 | 14 | 21 | 28 | | |
| Cpd. 1 50 g./ton continuous | 1 | 26.8 | 30.2 | 32.5 | 33.8 | 38.8 | 44.2 | 0/6 | 2/6 |
| | 2 | 27.0 | 29.7 | 31.0 | 33.2 | 40.0 | 46.7 | 0/6 | 1/6 |
| | Avg. | 26.9 | 30.0 | 31.8 | 33.5 | 39.4 | 45.5 | 0/12 | 3/12 |
| Infected Controls | 1 | 26.8 | 30.5 | 26.7 | 29.2 | 32.0 | 40.0 | 2/6 | 3/5 |
| | 2 | 27.0 | 30.0 | 27.8 | 31.0 | 35.2 | 42.4 | 1/6 | 1/5 |
| | Avg. | 26.9 | 30.3 | 27.3 | 30.1 | 33.6 | 41.2 | 3/12 | 4/10 |

The novel compounds of this invention are useful in combatting bactericidal infections such as dysentery, salmonellosis, colibacillosis, and pasteurellosis occurring in cattle (including calves), poultry, and swine, when administered thereto at dosage rates of from about 10 to about 200 g. per ton of feed. The dosage rate for treatment of salmonellosis in calves can also be expressed in mg./calf/day, and is suitably in the range of from about 50 mg/calf/day to about 1500 mg./calf/day.

Salmonellosis in cattle (calves) and swine, and dysentery in swine are controlled by the administration of the compounds at the rate of from about 25 to about 150 g. per ton of feed.

The compounds can be administered to the poultry, cattle, or swine orally by mixing with their normal feed ration. In the case of cattle or swine, the compounds can be administered in capsules, as suspensions prepared in suitable vehicles, such as a suspension in oil, or the compounds can be incorporated into a bolus. All these forms and methods of administration are well known to those skilled in the veterinary pharmaceutical art.

We claim:

1. A compound of the formula

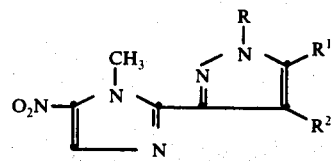

wherein

R is $C_1$–$C_3$ alkyl, halo($C_1$–$C_3$)alkyl, or hydroxy($C_1$–$C_3$)alkyl;

$R^1$ is

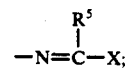

$R^2$ is cyano;

$R^5$ is hydrogen or $C_1$–$C_3$ alkyl;

X is $OR^7$; and $R^7$ is $C_1$–$C_8$ alkyl, $C_2$–$C_5$ alkenyl, or halo($C_1$–$C_3$)-alkyl.

2. A compound as in claim 1, said compound being methyl N-[4-cyano-1-methyl-3-(1-methyl-5-nitro-2-imidazolyl)-pyrazol-5-yl]formimidate.

3. A compound as in claim 1, said compound being butyl N-[4-cyano-1-methyl-3-(1-methyl-5-nitro-2-imidazolyl)-pyrazol-5-yl]formimidate.

4. A compound as in claim 1, said compound being ethyl N-[4-cyano-1-methyl-3-(1-methyl-5-nitro-2-imidazolyl)-pyrazol-5-yl]acetimidate.

5. A compound as in claim 1, said compound being allyl N-[4-cyano-1-methyl-3-(1-methyl-5-nitro-2-imidazolyl)-pyrazol-5-yl]formimidate.

6. A compound as in claim 1, said compound being 2-chloroethyl N-[4-cyano-1-methyl-3-(1-methyl-5-nitro-2-imidazolyl)pyrazol-5-yl]formimidate.

7. A compound as in claim 1, said compound being isobutyl N-[4-cyano-1-methyl-3-(1-methyl-5-nitro-2-imidazolyl)pyrazol-5-yl]formimidate.

8. A compound as in claim 1, said compound being 2-ethylhexyl N-[4-cyano-1-methyl-3-(1-methyl-5-nitro-2-imidazolyl)pyrazol-5-yl]formimidate.

* * * * *

UNITED STATES PATENT AND TRADEMARK OFFICE
CERTIFICATE OF CORRECTION

PATENT NO. : 4,075,222
DATED : February 21, 1978
INVENTOR(S) : John Pomfret Verge et al.

It is certified that error appears in the above-identified patent and that said Letters Patent are hereby corrected as shown below:

Column 3, line 28: Change "$CH\uparrow CHCH_3$, $--CH\uparrow CHC_6H_5$" to read -- $CH=CHCH_3$, $--CH=CHC_6H_5$ --.

Column 18, line 41: Change "procuct" to read -- product --.

Column 25, line 32: Change "afte" to read -- after --.

Column 27, line 56: Change "is" to read -- it --.

Column 30, line 53: Change "exposure" to read -- expose --.

Column 32, line 58: Change "gloove" to read -- glove --.

Signed and Sealed this

Fourth Day of July 1978

[SEAL]

Attest:

RUTH C. MASON
*Attesting Officer*

DONALD W. BANNER
*Commissioner of Patents and Trademarks*